US012439324B2

United States Patent
Muthuraman et al.

(10) Patent No.: US 12,439,324 B2
(45) Date of Patent: Oct. 7, 2025

(54) GEOFENCING FOR SATELLITE COMMUNICATION IN THE ABSENCE OF TERRESTRIAL NETWORKS

(71) Applicant: QUALCOMM Incorporated, San Diego, CA (US)

(72) Inventors: Kannan Muthuraman, Mission Viejo, CA (US); Gurdarshan Singh, Pleasanton, CA (US); Ronald Blumstein, San Jose, CA (US); Ricky Tai, Milpitas, CA (US); Murthy Vempati, San Jose, CA (US); Subrahmanyam Anand Mantravadi Venkata, San Diego, CA (US); Francesco Grilli, La Jolla, CA (US); Udayan Bhawnani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 18/311,878

(22) Filed: May 3, 2023

(65) Prior Publication Data

US 2024/0306073 A1     Sep. 12, 2024

Related U.S. Application Data

(60) Provisional application No. 63/489,514, filed on Mar. 10, 2023.

(51) Int. Cl.
*H04W 48/04*     (2009.01)
*H04B 7/185*     (2006.01)

(52) U.S. Cl.
CPC ........ *H04W 48/04* (2013.01); *H04B 7/18519* (2013.01)

(58) Field of Classification Search
CPC .......................... H04W 48/04; H04B 7/18519
See application file for complete search history.

(56) References Cited

U.S. PATENT DOCUMENTS 9,053,625 B2 *   6/2015   Daniel .................... A43B 3/00
10,433,107 B1   10/2019   Zhao et al.
(Continued)

FOREIGN PATENT DOCUMENTS

| WO | WO-2021209843 A1 | 10/2021 |
| WO | WO-2021221842 A1 | 11/2021 |
| WO | WO-2023020673 A1 | 2/2023 |

OTHER PUBLICATIONS

3GPP TR 23.737: "3rd Generation Partnership Project, Technical Specification Group Services and System Aspects, Study on Architecture Aspects for using Satellite Access in 5G (Release 17)", Technical Report, 3GPP TR 23.737, V17.2.0, 3GPP, Mobile Competence Centre, 650, Route Des Lucioles, F-06921 Sophia-Antipolis Cedex, France, vol. SA WG2, Mar. 31, 2021, pp. 1-95, XP052000260, Section 6.12.1.2, Section 6.12.1.3, Figure Fig. 6.12.1.3.1.

(Continued)

*Primary Examiner* — Dominic E Rego
(74) *Attorney, Agent, or Firm* — Weaver Austin Villenueve & Sampson LLP

(57) ABSTRACT

An example method of geofencing for satellite communication performed by a UE, the method comprising obtaining a first region file comprising a plurality of regions, wherein each region of the plurality of regions is represented by one or more geo-polygons, wherein each region of the plurality of regions corresponds to a respective unique region identifier, and obtaining a first restriction status file comprising restriction status information regarding each region of the plurality of regions. The method further comprises receiving, from a server, a second restriction status file comprising a second set of region identifiers and corresponding restric- (Continued)

tion status information, determining a difference between the first set of region identifiers and the second set of region identifiers, and updating the first region file, the first restriction status file, or both based on the difference.

30 Claims, 14 Drawing Sheets

(56) References Cited

U.S. PATENT DOCUMENTS

| | | | |
|---|---|---|---|
| 2002/0123343 A1 | 9/2002 | Wiedeman et al. | |
| 2005/0234772 A1* | 10/2005 | Haruki | G07C 5/085 |
| | | | 340/905 |
| 2006/0158766 A1* | 7/2006 | Tanimura | G11B 20/00275 |
| | | | 360/60 |
| 2011/0077022 A1* | 3/2011 | Scovill | H04L 63/105 |
| | | | 455/456.1 |
| 2015/0141045 A1* | 5/2015 | Qiu | H04W 4/021 |
| | | | 455/456.1 |
| 2016/0150365 A1* | 5/2016 | Brown | H04W 12/033 |
| | | | 455/410 |
| 2017/0155567 A1* | 6/2017 | Wei | H04L 63/1425 |
| 2017/0171703 A1 | 6/2017 | Maheswaranathan | |
| 2017/0171868 A1 | 6/2017 | Reis et al. | |
| 2017/0206559 A1* | 7/2017 | Bakshi | H04W 4/02 |
| 2020/0120992 A1* | 4/2020 | Fang | H04W 4/021 |
| 2020/0181969 A1* | 6/2020 | Fitzgibbon | G07C 9/00571 |
| 2021/0010316 A1* | 1/2021 | Hopkins | H04W 4/44 |
| 2021/0243583 A1* | 8/2021 | Hassan | H04W 4/021 |
| 2021/0243584 A1* | 8/2021 | Hassan | H04W 4/023 |
| 2021/0400053 A1* | 12/2021 | Jacobson | H04L 9/3213 |
| 2022/0279326 A1* | 9/2022 | Meijers | H04W 4/021 |
| 2022/0287082 A1* | 9/2022 | You | H04W 56/0045 |
| 2023/0051054 A1 | 2/2023 | Ma et al. | |
| 2023/0282122 A1* | 9/2023 | Ali | G08G 5/55 |
| | | | 701/3 |
| 2024/0306073 A1* | 9/2024 | Muthuraman | H04W 48/04 |

OTHER PUBLICATIONS

International Search Report and Written Opinion—PCT/US2024/018195—ISA/EPO—Jun. 17, 2024.

* cited by examiner

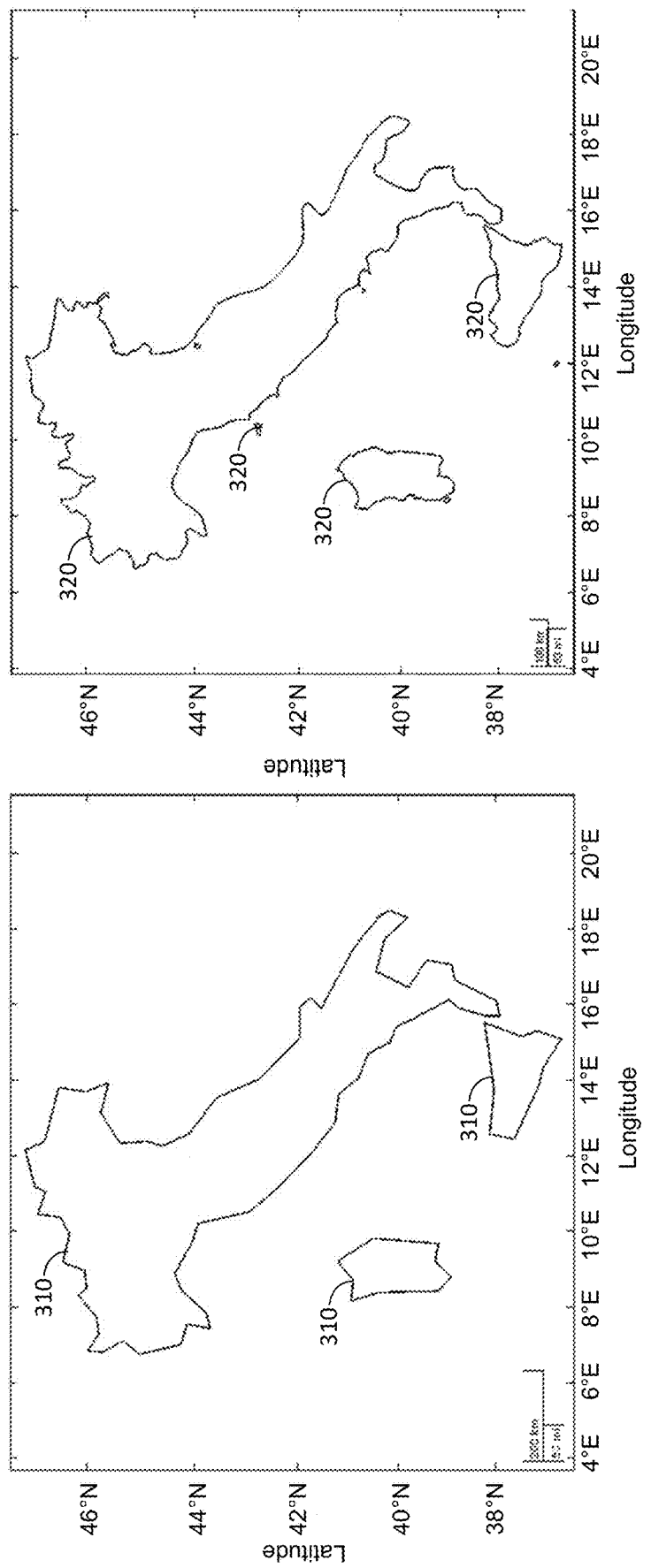

```
330
  341            342
"type":"FeatureCollection","features":[{"type":"Feature","geometry":{"type":"MultiPolygon","coordinates":[[[

[10.44270,46.89355],[11.04856,46.75136],...,[10.36338,46.48357],[10.44270,46.89355]]],[[
365
[[14.76125,38.14387],[15.52038,38.23116],...,[13.74116,38.03497],[14.76125,38.14387]]],[[[8.70999,40.89998],[

9.21001,41.20999],...,[8.16000,40.95001],[8.70999,40.89998]]],[[

[10.39512,42.85815],[10.42832,42.81919],...,[10.35898,42.82231],[10.39512,42.85815]]],[[

[13.93828,40.70562],[13.89365,40.69697],...,[13.96084,40.71816],[13.93828,40.70562]]],[[

[12.05127,36.75703],[12.00332,36.74600],...,[12.04805,36.77637],[12.05127,36.75703]]],[[[8.47891,39.06753],[

8.42148,38.96865],...,[8.44063,39.09063],[8.47891,39.06753]]],[[[8.28604,41.03984],[8.25273,40.99414],...,[8.31895,41.06274],[

8.28604,41.03984]]]]},"properties":{"name":"Italy","uniqueID":123456,"uncertainty":[110,110,110,50,50,50,50]}}]}
                                              360          350            355
                       345
```

FIG. 3C

GEOFENCING FOR SATELLITE COMMUNICATION IN THE ABSENCE OF TERRESTRIAL NETWORKS

RELATED APPLICATIONS

This application claims the benefit of U.S. Provisional Application No. 63/489,514, filed Mar. 10, 2023, entitled "GEOFENCING FOR SATELLITE COMMUNICATION IN THE ABSENCE OF TERRESTRIAL NETWORKS", which is assigned to the assignee hereof, and incorporated herein in its entirety by reference.

BACKGROUND

1. Field of Disclosure

The present disclosure relates generally to the field of wireless communications, and more specifically to enabling a user equipment (UE) (e.g., a mobile device) to communicate using satellite-based communications.

2. Description of Related Art

Satellite-based communications have been expanded from only enabling satellite phones that have specialized antennas for satellite-based communication to non-specialized devices, such as standard UEs (e.g., mobile devices). While being widely used, satellite-based communications are still restricted in more than 80 countries. Obtaining an up-to-date restriction status of one or more satellite-related services with respect to a UE for the region the UE locates in can be challenging in absence of any terrestrial networks.

BRIEF SUMMARY

An example method of geofencing for satellite communication performed by a UE, the method comprising obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The method also comprises obtaining a first restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons. The method further comprises receiving, from a server, a second restriction status file comprising a second set of region identifiers and corresponding restriction status information, determining a difference between the first set of region identifiers and the second set of region identifiers, and updating the first region file, the first restriction status file, or both based on the difference.

An example method of geofencing for satellite communication performed by a server, the method comprising obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The method also comprises obtaining a first restriction status file comprising restriction status information regarding each region of the plurality of regions, wherein the first restriction status file is indicative of, for each region of the plurality of regions, a restriction status of one or more satellite-related services with respect to a UE within the region represented by the one or more geo-polygons. The method further comprises receiving, from a UE of interest, a request for restriction status information for one or more regions of the plurality of regions, and responsive to receiving the request, transmitting, to the UE of interest, the first restriction status file.

An example method of geofencing for satellite communication performed by a UE, the method comprising obtaining a region file comprising a plurality of regions, wherein each region of the plurality of regions is represented by one or more geo-polygons, wherein each region of the plurality of regions corresponds to a respective unique region identifier. The method also comprises obtaining a restriction status file comprising restriction status information regarding each region of the plurality of regions, wherein the restriction status file is indicative of, for each region of the plurality of regions, a restriction status of one or more satellite-related services with respect to the UE within the region represented by the one or more geo-polygons. The method further comprises determining a position estimate of the UE and uncertainty associated with the position estimate, determining a corresponding geo-polygon of the one or more geo-polygons in the region file that corresponds to the position estimate based on the position estimate and the uncertainty associated with the position estimate, and obtaining restriction status information of the corresponding geo-polygon based on the restriction status file.

An example method of cloud-based geofencing for satellite communication performed by a server, the method comprising obtaining a region file comprising a plurality of regions, wherein each region of the plurality of regions is represented by one or more geo-polygons, wherein each region of the plurality of regions corresponds to a respective unique region identifier. The method also comprises obtaining a restriction status file comprising restriction status information regarding each region of the plurality of regions, wherein the restriction status file is indicative of, for each region of the plurality of regions, a restriction status of one or more satellite-related services with respect to a UE within the region represented by the one or more geo-polygons. The method further comprises obtaining a position estimate of a UE of interest and a unique identifier of the UE interest, determining a unique region identifier corresponding to the position estimate of the UE according to the region file, and determining restriction status including satellite-related service parameters applicable to the UE of interest based on the unique region identifier and the unique identifier of the UE of interest according to the restriction status file.

An example UE for geofencing for satellite communication comprising a transceiver, a memory, and one or more processors communicatively coupled with the transceiver and the memory. The one or more processors are configured to obtain a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The one or more processors are also configured to obtain a first restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons. The one or more processors are further configured to receive, from a server, a second restriction status file comprising a second set of region identifiers and corresponding restriction status information, determine a difference between the first set of region identifiers and the second set of region identifiers, and update the first region file, the first restriction status file, or both based on the difference.

An example server for geofencing for satellite communication comprising a transceiver, a memory, and one or more processors communicatively coupled with the transceiver and the memory. The one or more processors are configured to obtain a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The one or more processors are also configured to obtain a first restriction status file comprising restriction status information regarding each region of the plurality of regions, wherein the first restriction status file is indicative of, for each region of the plurality of regions, a restriction status of one or more satellite-related services with respect to a UE within the region represented by the one or more geo-polygons. The one or more processors are further configured to receive, from a UE of interest, a request for restriction status information for one or more regions of the plurality of regions, and responsive to receiving the request, transmit, to the UE of interest, the first restriction status file.

An example UE for geofencing for satellite communication comprising a transceiver, a memory, and one or more processors communicatively coupled with the transceiver and the memory. The one or more processors are configured to obtain a region file comprising a plurality of regions, wherein each region of the plurality of regions is represented by one or more geo-polygons, wherein each region of the plurality of regions corresponds to a respective unique region identifier. The one or more processors are also configured to obtain a restriction status file comprising restriction status information regarding each region of the plurality of regions, wherein the restriction status file is indicative of, for each region of the plurality of regions, a restriction status of one or more satellite-related services with respect to the UE within the region represented by the one or more geo-polygons. The one or more processors are further configured to determine a position estimate of the UE and uncertainty associated with the position estimate, determine a corresponding geo-polygon of the one or more geo-polygons in the region file that corresponds to the position estimate based on the position estimate and the uncertainty associated with the position estimate, and obtain restriction status information of the corresponding geo-polygon based on the restriction status file.

An example server for cloud-based geofencing for satellite communication comprising a transceiver, a memory, and one or more processors communicatively coupled with the transceiver and the memory The one or more processors are configured to obtain a region file comprising a plurality of regions, wherein each region of the plurality of regions is represented by one or more geo-polygons, wherein each region of the plurality of regions corresponds to a respective unique region identifier. The one or more processors are also configured to obtain a restriction status file comprising restriction status information regarding each region of the plurality of regions, wherein the restriction status file is indicative of, for each region of the plurality of regions, a restriction status of one or more satellite-related services with respect to a UE within the region represented by the one or more geo-polygons. The one or more processors are further configured to obtain a position estimate of a UE of interest and a unique identifier of the UE interest, determine a unique region identifier corresponding to the position estimate of the UE according to the region file, and determine restriction status including satellite-related service parameters applicable to the UE of interest based on the unique region identifier and the unique identifier of the UE of interest according to the restriction status file.

This summary is neither intended to identify key or essential features of the claimed subject matter nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 3A-3B are diagrams of example geo-polygons representing different regions in geofencing, according to an embodiment.

FIG. 3C illustrates an example region file where the plurality of the geo-polygons are represented using GeoJSON format, according to an embodiment.

Figure 1:
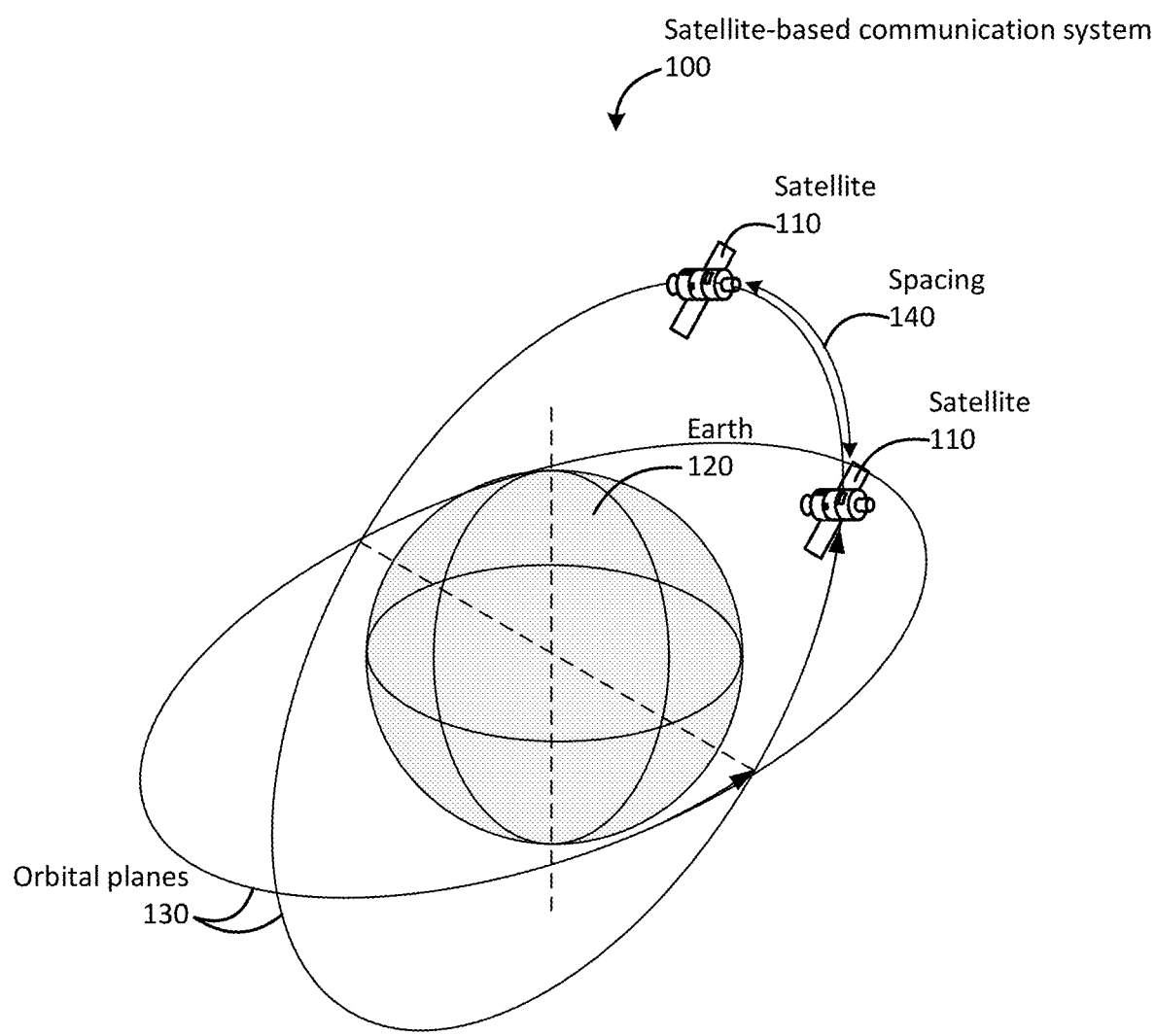
FIG. 1 is a diagram of a satellite-based communication system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

Various aspects relate generally to the field of wireless communications. Some aspects more specifically relate to geofencing in satellite-based communication.

When performing geofencing in satellite-based communication, obtaining an up-to-date restriction status of one or more satellite-related services with respect to a UE (e.g., whether satellite-based communication is permitted, whether satellite-based communication or positioning is affected, or any combination thereof) for the region the UE locates in can be challenging in absence of any terrestrial networks. In some examples, a server may be used for obtaining and/or updating a region file and/or restriction status file(s) of a UE for geofencing.

When performing geofencing, each region in the region file may be represented by one or more geo-polygons. Each region may correspond to a respective unique region identifier (e.g., a hash of region details of corresponding one or more geo-polygons and a version indicator of the region file). The restriction status file may include restriction status information regarding each region, indicative of, for each region, a restriction status of one or more satellite-related services with respect to the UE within the region represented by the one or more geo-polygons. For example, the restrictions may include whether satellite communication is permitted by a provider, whether satellite communication is affected, the level of service (e.g., whether only emergency calls are allowed or person-to-person messaging is also allowed), transmit power level, amount of data that can be used, which satellite constellations are available, or any combination thereof. When using the geofencing, the UE may determine a position estimate of the UE, determine uncertainty associated with the position estimate, determine a corresponding geo-polygon of the one or more geo-polygons that corresponds to the position estimate based on the position estimate and the uncertainty associated with the position estimate, and may obtain restriction status information of the corresponding region represented by the geo-polygon based on the restriction status file.

Particular aspects of the subject matter described in this disclosure can be implemented to realize one or more of the following potential advantages. In some examples, by periodically updating the region file and/or the restriction status file (e.g., at different frequencies) of geofencing stored in the UE, the described techniques can allow the UE to obtain an up-to-date restriction status of one or more satellite-related services with respect to the UE for the region the UE locate. In some embodiments, the UE may determine the proximity to near-by region(s) with service restrictions (e.g., determined based on a velocity and heading of the UE). In some embodiments, the GNSS duty cycle of the UE may be optimized based on the proximity to a region of interest specified in the region file. For example, if the UE is far away from the region of interest, the GNSS function may be wake-up at a lower frequency.

Accordingly, when the UE roams to a region where one or more of the satellite-related services are restricted in absence of a terrestrial network (e.g., hiking or traveling in remote places, or traveling in airplane mode), the UE may still take appropriate actions (e.g., use signals from bands unaffected/not banned, notify the user the restrictions) responsive to the up-to-date restriction status of the one or more satellite-related services for the region.

FIG. 1 is a diagram of a satellite-based communication system 100 in which satellites 110 orbits the earth 120, traveling along a path in orbital plane 130. For simplicity, the diagram has been greatly simplified. In practical embodiments, satellite-based communication systems 100 may comprise dozens of satellites 110 with many orbital planes 130. The Iridium® communication system, for example, has 66 satellites: 11 satellites in each of the six orbital planes. To help optimize communication efficiency, satellites 110 in such satellite-based communication systems 100 are typically equally spaced such that the spacing 140 is approximately the same between all satellites 110 in an orbital plane 130.

Satellite-based communication systems, such as the one illustrated in FIG. 1 generally operate satellites within low earth orbit (LEO), in which the altitude of the satellites is 2,000 km or less. That said, some satellite-based communication systems may operate in medium earth orbit (MEO) (with an altitude of approximately 10,000 to 20,000 callers) or geostationary earth orbit (GEO) (with an altitude of approximately 35,786 km).

Figure 2:
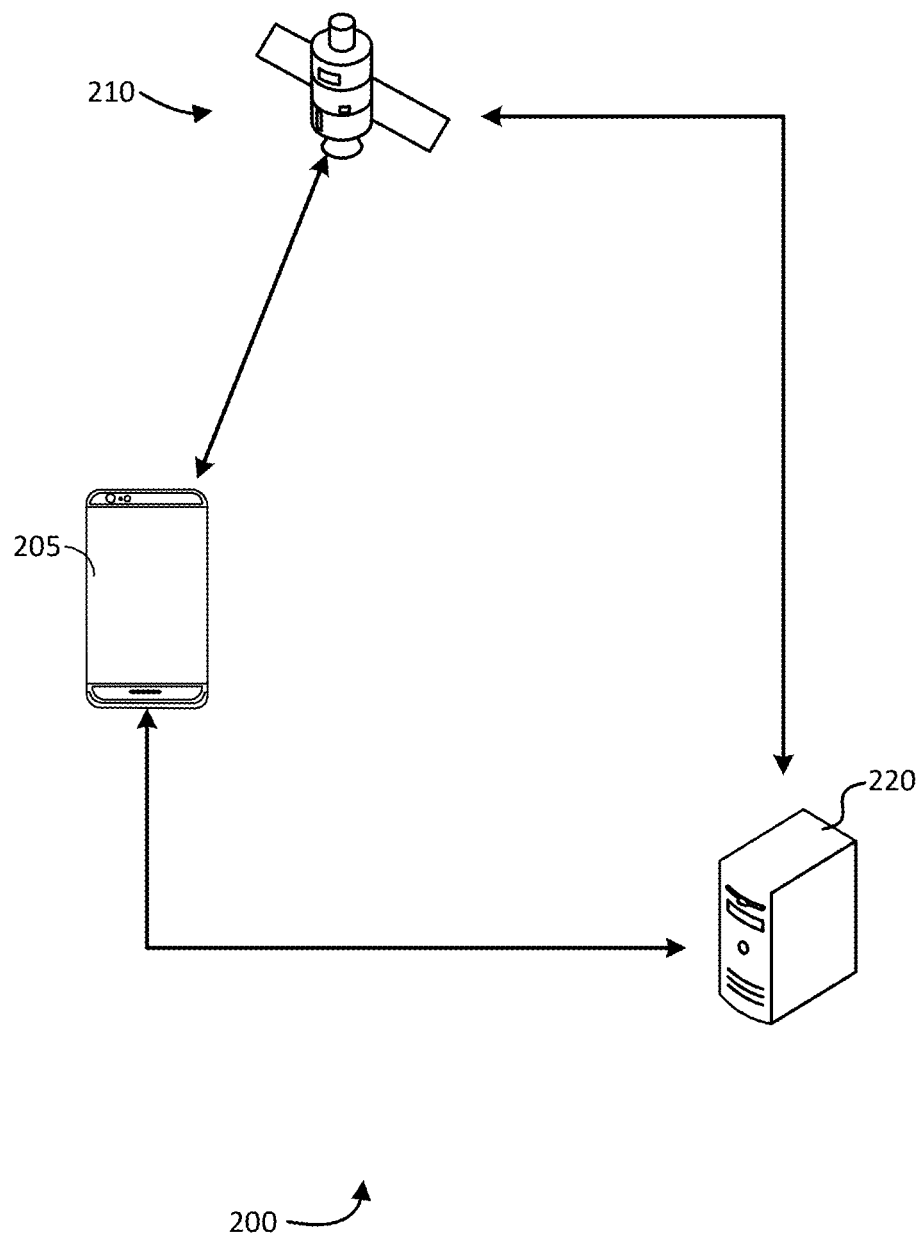
FIG. 2 illustrates an example architecture of a system for providing a UE with assistance data for geofencing in satellite-based communications, according to an embodiment.

FIG. 2 illustrates an example architecture 200 of a system for providing a UE 205 with assistance data for geofencing in satellite-based communications, according to an embodiment. Satellite 210 may correspond to satellite 110 in FIG. 1. Arrows represent communication links, which may include one or more intervening devices, networks, etc. (not shown). As with other figures, FIG. 2 is provided as a nonlimiting example, and alternative embodiments may include additional or alternative components for providing assistance data to the UE 205.

In the example architecture 200, geofencing can be performed utilizing server 220 connected to satellite 210. Here, server 220 may comprise a computer server hosted in the cloud by a service for providing assistance data for geofencing in satellite-based communications. The service may be provided, for example, by a satellite-based communication carrier, mobile phone carrier, etc. communication between server 220 and UE 205 and may be relayed via one or more wired and/or wireless networks, including the Internet, a wireless cellular network, etc. In some embodiments, UE 205 may also receive assistance data from satellite 210 directly.

As will be disclosed in detail below, server 220 and/or satellite 210 may provide geofencing information (e.g., the region file(s) and the restriction status files) to UE 205, such that UE 205 may obtain the up-to-date restriction status of the one or more satellite-related services for one or more regions and take appropriate actions (e.g., use signals from bands unaffected/not banned, notify the user the restrictions) accordingly.

As noted above, geofencing for satellite-based communication enables a UE to obtain the up-to-date restriction status of the one or more satellite-related services for the region when roaming in areas where the services are restricted and even in absence of a terrestrial network (e.g., hiking or traveling in remote places, or traveling in airplane mode). The UE may take appropriate actions (e.g., to use signals from bands unaffected/not banned, to notify the user of the restrictions). For example, the UE may obtain (e.g., download or update) relevant assistance data of geofencing (e.g., the region file(s) and/or the restriction status files) ahead of time (e.g., from a region where there are no satellite-based communication restrictions, from a region where there are terrestrial network connections, and/or by pre-programing), and perform the geofencing when roaming to a region where one or more of the satellite-related services are restricted. The UE may then use the relevant assistance data of geofencing to determine the restrictions and may take appropriate actions (e.g., use signals from bands unaffected/not banned and/or notify the user of the restrictions) in response.

In some embodiments, the relevant assistance data of geofencing may include the region file(s) representing different features or regions of interest and/or the restriction status files indicating restriction status information for features or regions of interest of each of the different regions. For example, in the region file (e.g., typically a few Kbytes in size), different regions may be represented by one or more geo-polygons where each region of the different regions is indexed with a respective unique identifier.

In some embodiments, the restriction status files (e.g., typically a few bytes in size per feature) may be included in the assistance data provided for each feature of interest. When updating the restriction status files, a server may identify a list of regions of interest (e.g., corresponding to a sub-set of the regions in the region file) along with the associated restriction status and any relevant details (e.g., whether the satellite-based communication is allowed, which constellations and bands are available, and/or whether the communication or positioning is affected by spoofing/jamming). In some embodiments, restriction status files can be updated at a faster rate than the region file.

FIGS. 3A-3B are diagrams of example geo-polygons representing different regions in geofencing, according to an embodiment. As shown in FIG. 3A, Italy is represented using three polygons 310 with a resolution of 110 m. In some embodiments, other resolutions may also be used. For example, as shown in FIG. 3B, with a resolution of 50 m, 10 geo-polygons 320 (only part of the 10 geo-polygons 320 are labeled for ease of illustration) are used to represent Italy. When a higher resolution (e.g., geo-polygons having vertices spaced closer together) is used, more map details of the region (e.g., having a more accurate representation of the shape and size of the region, smaller regions) may be shown. The boundary of the region the geo-polygons represent may also be defined with more precision and detail. For example, when representing small islands, or overlapping regions (e.g., region(s) within a region such as Vatican City within Rome), geo-polygons with finer resolutions may be used.

In some embodiments, geo-polygons with different resolutions may be used in a region file to achieve desired performance. For example, large regions (e.g., the peninsula) may be represented by geo-polygons with a resolution of 110 m, and small regions (e.g., the islands and/or the overlapping regions) may be represented by geo-polygons with a resolution of 50 m. It is noted that geo-polygons with other resolutions may also be used for desired performance.

In some embodiments, the geo-polygons of a region file may be represented using various standardized formats (e.g., GeoJSON, shapefile, KML, well-known text (WKT)). As a non-limiting example, FIG. 3C illustrates an example region file 330 where the plurality of the geo-polygons in region file 330 are represented using GeoJSON format, according to an embodiment.

As shown in FIG. 3C, in some embodiments, region file 330 may have multiple "Features" 342 in a "FeatureCollection" 341, where each "Feature" 342 represents a region of interest with one or more geo-polygons. Region file 330 may also include a properties section 345 providing information associated with the plurality of geo-polygons included in region file 330. For example, properties section 345 may include a readable name 350 (e.g., the name of the region represented), uncertainty 355 in the geo-polygon boundary (e.g., the resolution for each geo-polygon represented in meters), and a unique ID 360 (e.g., a hash of region details of corresponding one or more geo-polygons and a version indicator of the region file)). In some embodiments, region file 330 also include geographic details of each geo-polygon, e.g., coordinates 365 (e.g., a longitude and a latitude) of the vertices of each geo-polygon of the plurality of geo-polygons included in region file 330, or hierarchical index of tiles that constitute each geo-polygon of the plurality of geo-polygons included in the region file 330.

In some embodiments, region file 330 may include a header. The header may include a version number of region file 330, a time-stamp of the latest update, a file signature, a summary of the contents, high-level properties applicable for all geo-polygons included, or any combination thereof. In some embodiments, each region of region file 330 may correspond to a region identifier. For example, the region identifier may be a hash of the map version number and the geo-polygon details (e.g., coordinates of the one or more geo-polygons used to represent the region, properties of the region). Thus, the region identifier may be unique to the corresponding region. Accordingly, the plurality of regions in region file 330 may correspond to a set of region identifiers.

In some embodiments, region file 330 may also include the set of region identifiers and associated properties (e.g., features such as whether satellite communication is permitted, whether satellite-based communication or positioning is affected, or any combination thereof). In some embodiments, region file 330 can be feature agnostic. For example, different features can require different regions to be restricted.

In some embodiments, region file 330 may be obtained from a server when a UE is in a region where there are no restrictions on satellite-based communication, and/or from a region where there are terrestrial network connections. Additionally or alternatively, region file 330 may be pre-programmed in the UE (e.g., region file 330 is factory loaded to the UE). In some embodiments, as will be discussed in detail below, region file 330 stored in the UE may be updated by the server periodically (e.g., every few weeks or months). Alternatively or additionally, region file 330 may be updated when one or more new geo-polygons are added to region file 330 or boundaries of one or more geo-polygons of region file 330 are adjusted. In some embodiments, when being transmitted (e.g., for obtaining and/or updating region file 330), region file 330 may be converted to an extensible binary format using e.g., binary encoding for geographic data.

Figure 4:
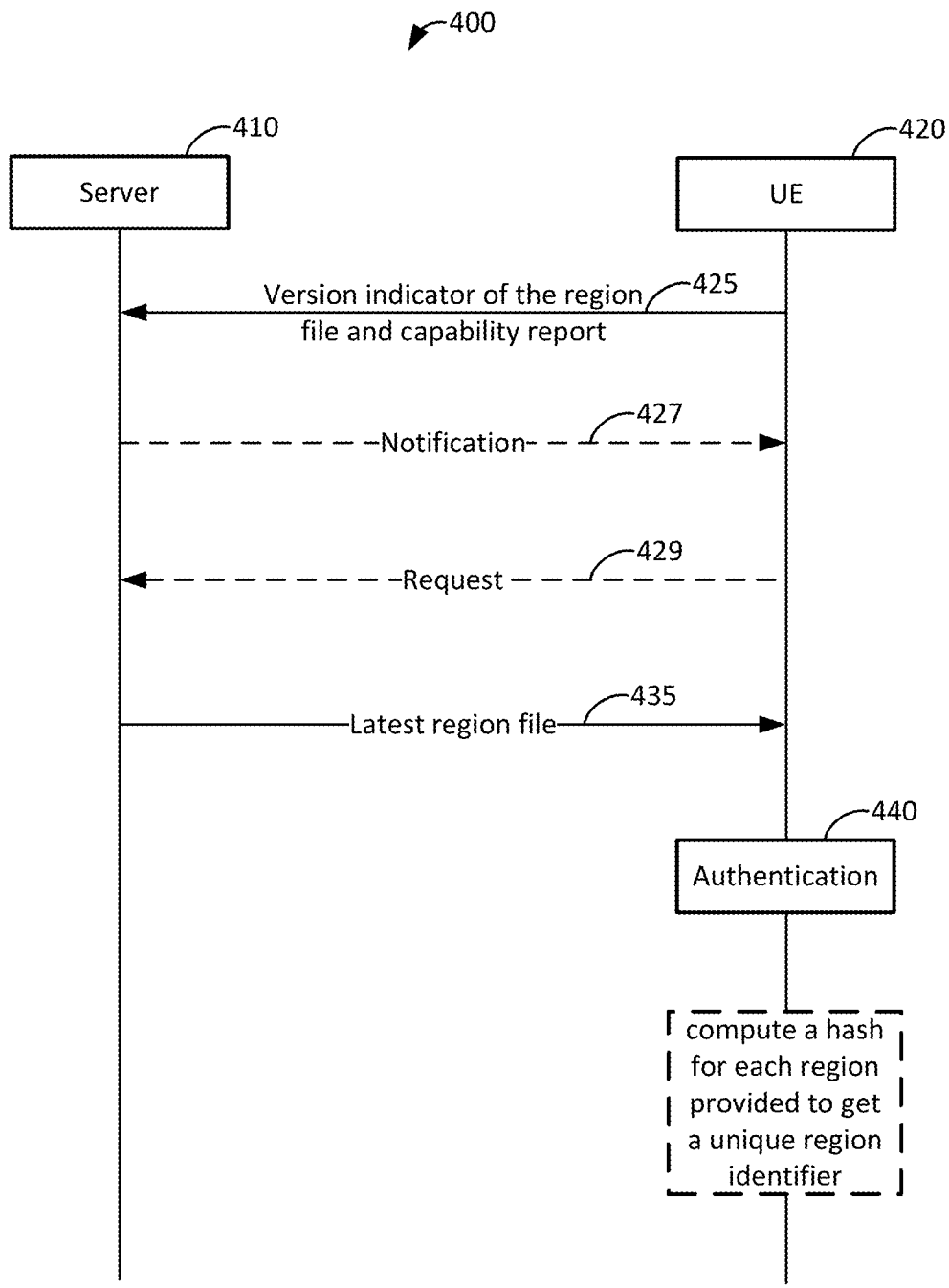
FIG. 4 is a flow diagram illustrating how a region file of geofencing may be updated from a server for satellite-based communications, according to some embodiments.

FIG. 4 is a flow diagram illustrating how a region file of geofencing may be updated from a server for satellite-based communications, according to some embodiments. In some embodiments, an update process 400 may be performed between a server 410 (e.g., server 220 in FIG. 2) and a UE 420 (e.g., UE 205 in FIG. 2).

Starting at arrow 425, device-specific information of UE 420 (e.g., which feature(s) information are required by UE 420, and/or a version indicator of the region file stored in UE 420) may be transmitted from UE 420 to server 410. In some embodiments, the device-specific information of UE 420 may include device capability report such as constellations and/or signal bands supported. In some embodiments, as noted above, UE 420 may be pre-load with a first region file. The version indicator of the first region file may indicate the version number of the first region file and/or a time-stamp of the last update of the first region file.

At arrow 435, responsive to a determination that the first region file is different from a second region file stored on the server (e.g., the latest version of the region file), the second region file may be transmitted from server 410 to UE 420. In some embodiments, the determination may be made based on comparing the version indicators of the first region file and the second region file. The first region file and the second region file may be considered different region files if the version indicator of the first region file is different from the version indicator of the second region file.

In some embodiments, before transmitting the second region file, a notification 427 of the second region file may be transmitted from server 410 to UE 420. Upon receiving the notification, UE 420 may initiate the update process (e.g., initiating the download of the second region file) by transmitting a request 429 for the second region file.

At block 440, UE 420 may perform an authentication of the second region file received from server 410. In some embodiments, the authentication may be performed based on the file signature included in the second region file (e.g., the header or any portion of the file that agreed by both server 410 and UE 420).

In some embodiments, after authenticating the second region file, UE 420 may compute a unique region identifier for each of the regions provided in the second region file to get a unique region identifier. For example, UE 420 may compute the unique region identifier as a hash of selected common information from the header of the second region file (e.g. map version) and information specific to each region (e.g., one or more geo-polygons used to represent the region, geometric representation of each geo-polygon of the one or more geo-polygons and associated properties) in the different regions included in the second region file.

Figure 5:
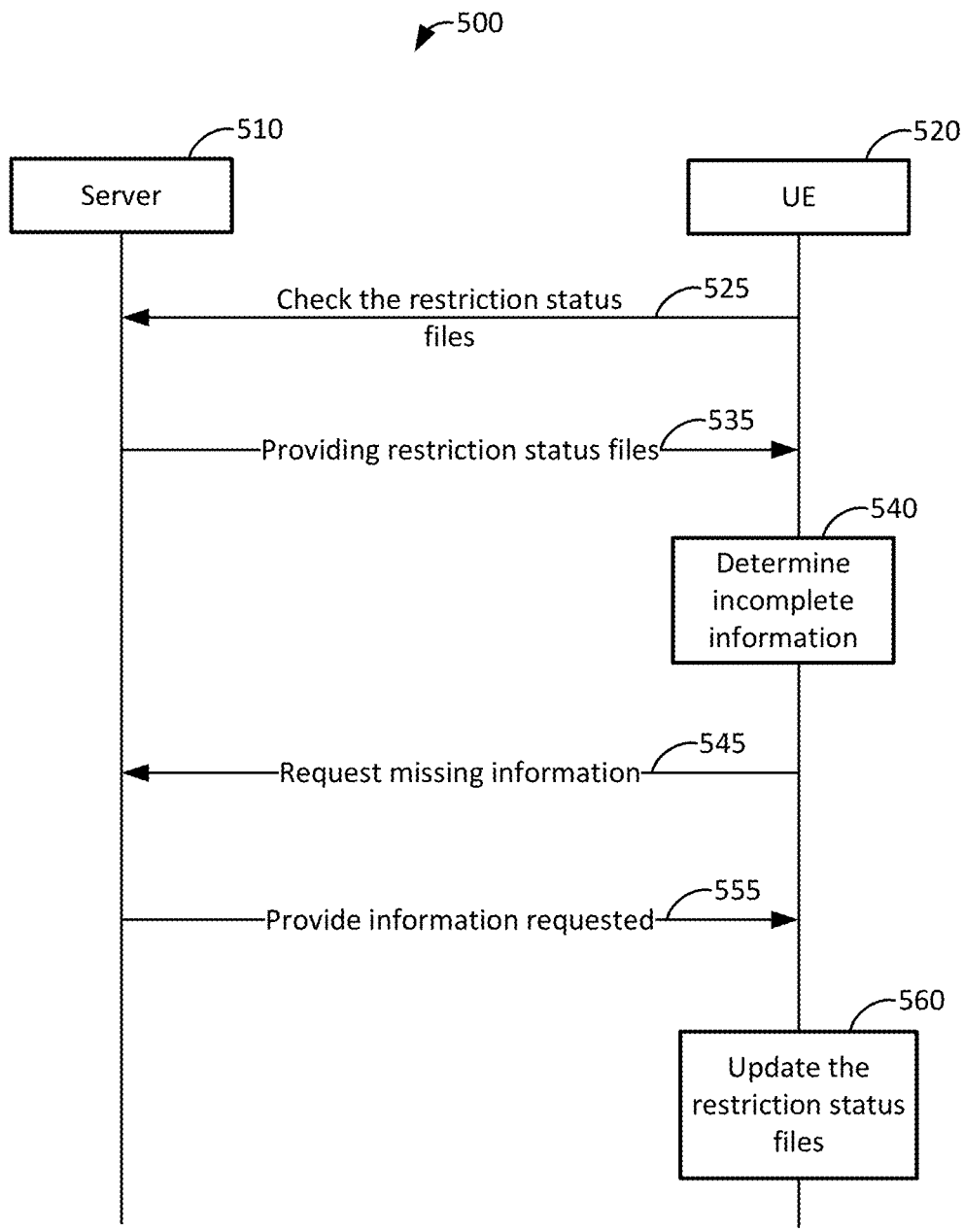
FIG. 5 is a flow diagram illustrating how a restriction status file of geofencing may be updated from a server for satellite-based communications, according to some embodiments.

FIG. 5 is a flow diagram illustrating how a restriction status file of geofencing may be updated from a server or a satellite for satellite-based communications, according to some embodiments. In some embodiments, an update process 500 may be performed between a server 510 (e.g., server 220 in FIG. 2 and/or server 410 in FIG. 4) and a UE 520 (e.g., UE 205 in FIG. 2 and/or UE 420 in FIG. 4).

Starting from arrow 525, UE 520 may check the restriction status file(s) at server 510. For example, UE 520 may transmit a request to server 510 for checking the restriction status file(s) at server 510. In some embodiments, a capability report indicating satellite-related services supported by UE 520 may also be included in the request.

At arrow 535, server 510 may provide the restriction files to UE 520 responsive to the request. In some embodiments, the restriction status file may include a list of unique region identifiers and restriction status information regarding a respective unique region identifier (e.g., restriction status information about the region corresponding to the unique geo-polygon identifier, represented by the one or more geo-polygons). Accordingly, the restriction status file may be indicative of, for each region of the different regions corresponding to the list of unique region identifiers, a restriction status of one or more satellite-related services with respect to UE 520 within the region represented by the one or more geo-polygons. In some embodiments, the restriction status file may be determined based on the capability report. For example, the restriction files may indicate information regarding the satellite-related services supported by UE 520 and the region of interest (e.g., a set of region identifiers corresponding to the one or more regions indicated in the request).

At block 540, UE 520 may determine if information in a first restriction status file of UE 520 is incomplete. For example, the first restriction file and a corresponding first region file may be pre-loaded and stored in UE 520. The first restriction status file may include restriction status information regarding a first list of unique region identifiers corresponding to a first set of a plurality of regions included in the first region file. UE 520 may compare the first list of unique region identifiers with the list of unique region identifiers included in the restriction file received from server 510. If a difference between the first list of unique geo-polygon identifiers and a second list of unique geo-polygon identifiers included in the restriction status file received from server 510 is determined (e.g., the second list of unique geo-polygon identifiers being a subset of unique geo-polygon identifiers of the first list of unique geo-polygon identifiers, or one or more unique geo-polygon identifiers in the second list of unique geo-polygon identifiers is missing in the first list of unique geo-polygon identifiers) information in the first restriction and/or region file of UE 520 may need an update.

At arrow 545, responsive to the determination that the information in the first restriction and/or region file needs an update, UE 520 may transmit a request for the missing information to server 510. For example, a missing/different unique region identifier in the first list of unique region identifiers may indicate missing information for a new region or modified information for a region available in the first list of unique region identifiers or a region dropped from the regions of interest. UE 520 may request information regarding the missing region from server 510.

At arrow 555, server 510 may provide the requested information to UE 520. For example, the information may include the map version, the geographic details of the region, and the corresponding restriction status information associated with the region represented by the one or plurality of geo-polygons.

At block 560, UE 520 may update or replace the first restriction status file according to the requested information received from server 510. For example, if at block 540, it is determined that the second list of unique geo-polygon identifiers is a subset of unique geo-polygon identifiers of the first list of unique geo-polygon identifiers, it may indicate that the satellite-communication service restriction in the regions corresponding to the missing identifiers in second set of unique geo-polygon identifiers were removed. Accordingly, UE 520 may update the first region file and/or the first restriction status file by deleting the region details (e.g., geometry, properties) of the regions corresponding to those missing unique geo-polygon identifiers in the second set unique geo-polygon identifiers from the first region file and/or the first restriction status file.

Additionally or alternatively, if at block 540, it is determined that the second list of unique geo-polygon identifiers includes one or more identifiers which are not part of the first set of unique geo-polygon identifier, it may indicate that data regarding the regions corresponding to the new identifiers is missing in the first region file and/or the first restriction status file (e.g., one or more satellite-communication service restriction is added to the region and/or a border of the region is redrawn or represented by different geo-polygons). UE 520 may optionally request for missing region data for the new identifiers as illustrated with regard to arrows 545 and 555 and replace the prior region data with the requested information. After updating the region file and/or the restriction status file (e.g., obtaining the up-to-date version of the region file and/or the restriction status file), when roaming to a different region even in absence of a terrestrial network (e.g., hiking or traveling in remote places, or traveling in airplane mode), the UE will be able to use the up-to-date restriction status information regarding the region of interest based on the updated region and restriction status files.

Figure 6:
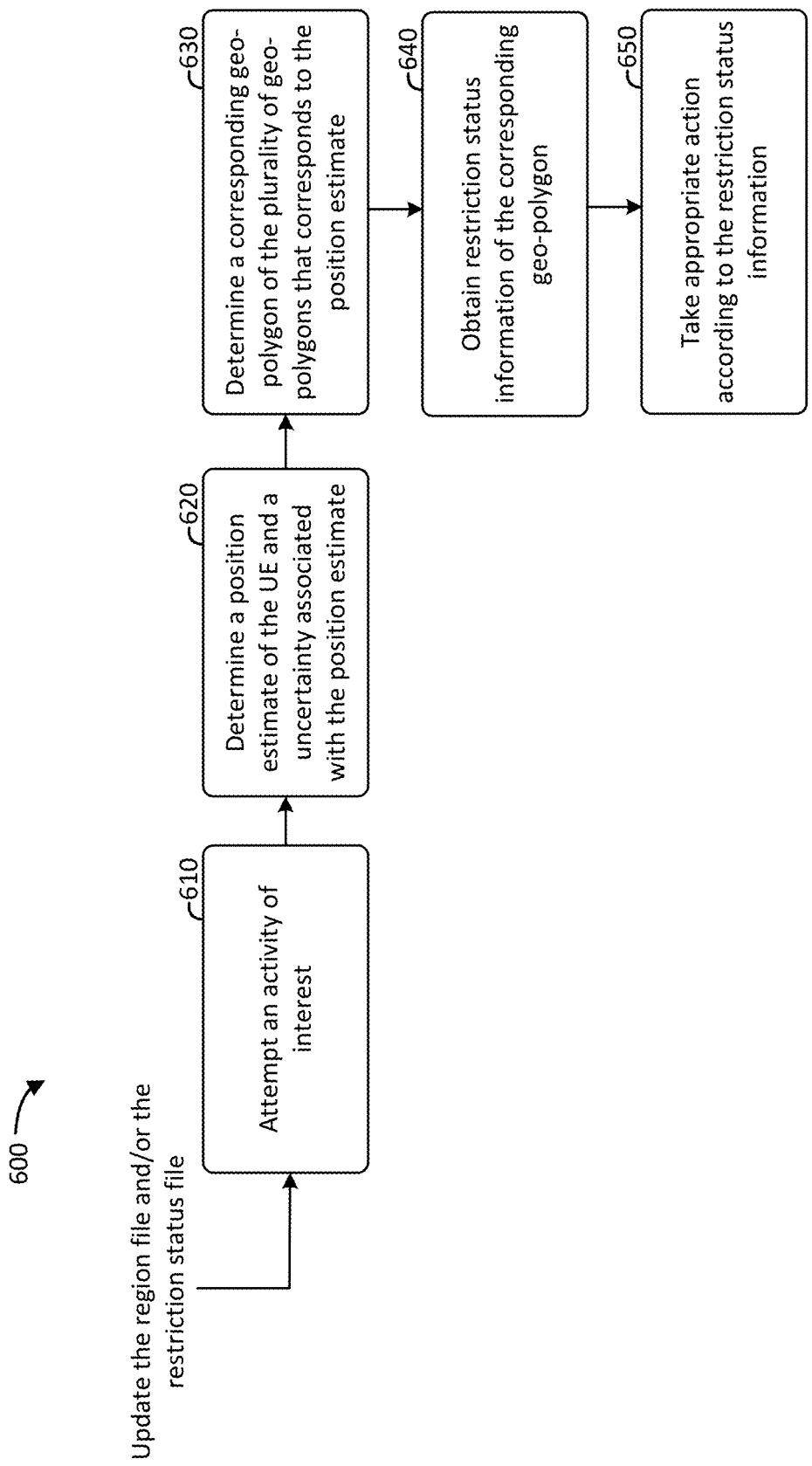
FIG. 6 is a flow diagram illustrating how geofencing may be performed by a UE for satellite-based communications, according to some embodiments.

FIG. 6 is a flow diagram illustrating how geofencing may be performed by a UE for satellite-based communications, according to some embodiments. In some embodiments, geofencing 600 may be performed by a UE (e.g., UE 205 in FIG. 2, UE 420 in FIG. 4, and/or UE 520 in FIG. 5).

In some embodiments, before starting geofencing 600, the UE may obtain the up-to-date version of the region file and/or the restriction status file by receiving, from the server, the region file and the restriction status file (e.g., updating the region file and/or the restriction status file with respect to FIGS. 4 and/or 5), or retrieving the region file and restriction status file from local storage/memory (e.g., preloading the up-to-date version of the region file and/or the restriction status file).

In some embodiments, geofencing 600 may start at block 610 where an activity of interest (e.g., a satellite-based communication-related activity such as satellite messaging and/or Global navigation satellite system (GNSS) positioning) may be attempted by the UE.

At block 620, a position estimate of the UE and uncertainty associated with the position estimate may be determined. In some embodiments, in absence of a terrestrial network (e.g., traveling in airplane mode), the UE may determine the position estimate using GNSS signals.

At block 630, a geo-polygon of the plurality of geo-polygons included in the region file, corresponding to the position estimate may be determined. In some embodiments, a list of candidate geo-polygons related to the position estimate may be determined (e.g., a subset geo-polygon of the plurality of geo-polygons near the position estimate considering the uncertainty associated with the position estimate) based on applying a supervised learning algorithm on the plurality of geo-polygons (e.g., applying a decision tree on the plurality of geo-polygons). The UE may then check locations/points in each geo-polygons of the subset of geo-polygons (e.g., run point in each geo-polygon of the subset of geo-polygons).

At block 640, restriction status information of the corresponding geo-polygons may be obtained. For example, the restriction status information regarding the activity of interest may be obtained based on the associated restriction status file.

At block 650, appropriate action(s) may be taken based on the restriction status information. In some embodiments, the appropriate action(s) may include notifying the user of the satellite messaging restrictions, removing GNSS bands affected by jamming or spoofing, etc.

Figure 7:
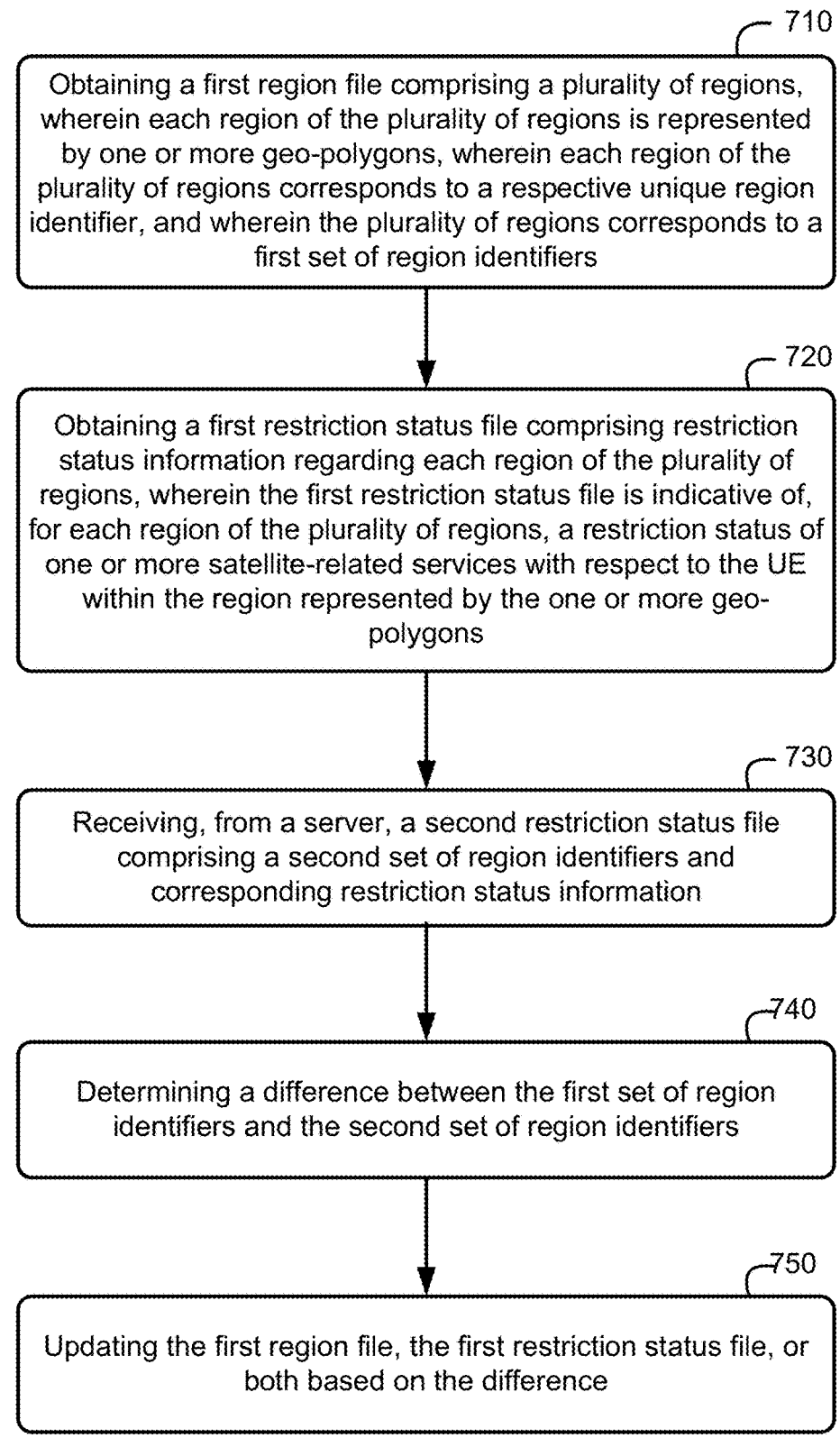
FIG. 7 is a flow diagram of a method for updating geofencing in satellite-based communications performed by a UE, according to some embodiments.
Figure 10:
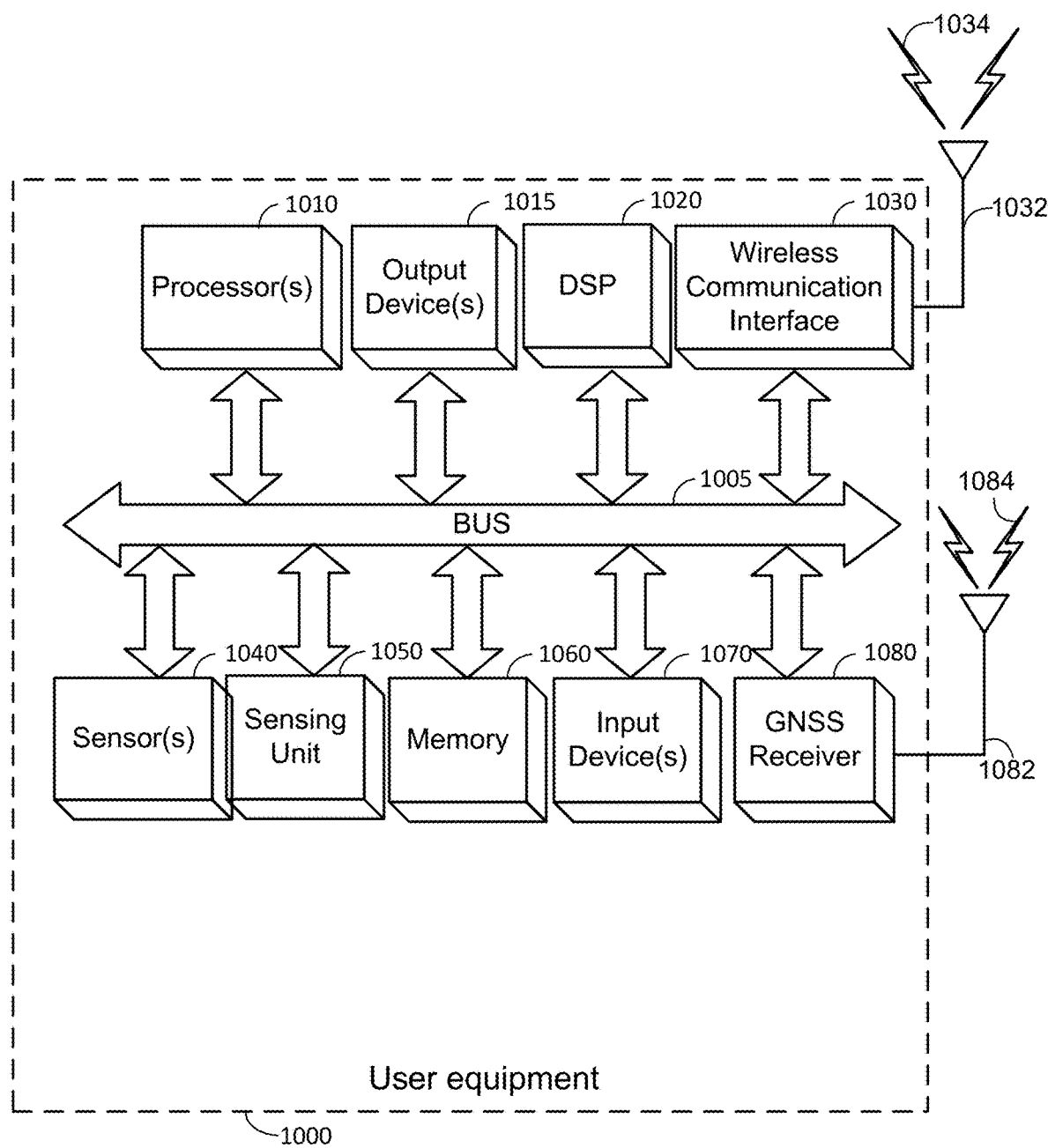
FIG. 10 is a block diagram of an embodiment of a UE, which can be utilized in embodiments as described herein.

FIG. 7 is a flow diagram of a method 700 for updating geofencing in satellite-based communications performed by a UE, according to some embodiments. In some embodiments, the UE may correspond to UE 205 in FIG. 2, UE 420 in FIG. 4, and/or UE 520 in FIG. 5. Means/structure for performing the functionality illustrated in one or more of the blocks shown in FIG. 7 may be performed by hardware and/or software components of a UE, as described herein. Example components of a UE are illustrated in FIG. 10, which are described in more detail below.

At block 710, the functionality comprises obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. As noted above, each region identifier may comprise a hash of geometry and properties of the plurality of geo-polygons used to represent the region and a map version indicator of the first region file.

In some embodiments, the plurality of geo-polygons in the first region file may correspond to different resolutions. When a higher resolution (e.g., geo-polygons having vertices spaced closer together) is used, more map details of the region (e.g., having a more accurate representation of the shape and size of the region) may be shown. The boundary of the region the geo-polygons represent may also be defined with more precision and detail. For example, when representing small islands, or overlapping regions (e.g., region(s) within a region such as Vatican City within Rome), geo-polygons with finer resolutions may be used.

In some embodiments, the geo-polygons of the first region file may be represented using various standardized formats (e.g., GeoJSON, shapefile, KML, WKT). In some embodiments, the first region file may include a header that includes a version number of the first region file, a timestamp of the last update, a file signature, a summary of the contents, high-level properties applicable for all geo-polygons included, or any combination thereof.

In some embodiments, as noted above, the first region file may be received from a server or may be retrieved from local storage/memory. For example, the first region file may be received from the server when the UE is in a region that has no restrictions in satellite-based communication, a region where there are terrestrial network connections. Additionally or alternatively, the first region file may be pre-programmed in the UE. In some embodiments, when being transmitted (e.g., for obtaining and/or updating the first region file), the first region file may be converted to an extensible binary format using e.g., binary encoding for geographic data.

Means for performing functionality at block 710 may comprise a bus 1005, processor(s) 1010, wireless communication interface 1030, memory 1060, and/or other components of a UE 1000, as illustrated in FIG. 10.

At block 720, the functionality comprises obtaining a first restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons.

In some embodiments, as noted above, the first restriction status file may be received from a server or may be retrieved from local storage/memory. For example, the first restriction status file may be received from the server when the UE is in a region that has no restrictions in satellite-based communication, a region where there are terrestrial network connections. Additionally or alternatively, the first restriction status may be pre-programmed in the UE.

In some embodiments, the restriction status information may comprise information regarding different features corresponding to whether satellite-based communication or positioning is permitted, whether satellite-based communication or positioning is affected, or any combination thereof.

Means for performing functionality at block 720 may comprise a bus 1005, processor(s) 1010, wireless communication interface 1030, memory 1060, and/or other components of a UE 1000, as illustrated in FIG. 10.

At block 730, the functionality comprises receiving, from a server, a second restriction status file comprising a second set of region identifiers and corresponding restriction status.

In some embodiments, prior to receiving the second restriction status, method 700 may also include transmitting, to the server, a request for the second restriction status indicating a version indicator of the first region file. In some embodiments, the request may indicate a capability report indicating satellite-related services supported by the UE. In some embodiments, the second restriction status file may be determined based on the capability report (e.g., being customized to include restriction status information regarding satellite-related services supported by the UE).

In some embodiments, method 700 may include transmitting, to the server, a version indicator of the first region file. Responsive to a determination that the first region file is different from a second region file, determined based on the version indicator of the first region file (e.g., the version indicator of the first region file is different from the version indicator of the second region file), receiving, from the server, the second region file. In some embodiments, method 700 may also include authenticating the second region file received from the server (e.g., based on the file signature included in the header of the second region file).

Means for performing functionality at block 730 may comprise a bus 1005, processor(s) 1010, wireless communication interface 1030, memory 1060, and/or other components of a UE 1000, as illustrated in FIG. 10.

At block 740, the functionality comprises determining a difference between the first set of region identifiers and the second set of region identifiers. For example, the UE may determine if the information in the first region file is incomplete. In some embodiments, the UE may compare the first list of unique region identifiers with the list of unique region identifiers included in the second restriction file received from the server. If one or more region identifier in the list of unique region identifiers included in the second restriction file is missing/different from the first list of unique region identifiers, information in the first restriction and region file of the UE may be incomplete.

Means for performing functionality at block 740 may comprise a bus 1005, processor(s) 1010, wireless communication interface 1030, memory 1060, and/or other components of a UE 1000, as illustrated in FIG. 10.

At block 750, the functionality comprises updating the first region file, the first restriction status file, or both based on the difference. For example, responsive to the determination that the information in the first restriction file needs an update, the UE may transmit a request for the missing information to the server or modified information for a region available in the first list of unique region identifier as noted above. For example, a missing/different unique region identifier in the first list of unique region identifiers may indicate missing or modified information for a region represented by one or more geo-polygons. The UE may request information regarding the missing region from the server.

Means for performing functionality at block 750 may comprise a bus 1005, processor(s) 1010, wireless communication interface 1030, memory 1060, and/or other components of a UE 1000, as illustrated in FIG. 10.

In some embodiments, method 700 may also include updating the first region file and/or the first restriction status file based on the second region file and/or the missing information received from the server.

Figure 8:
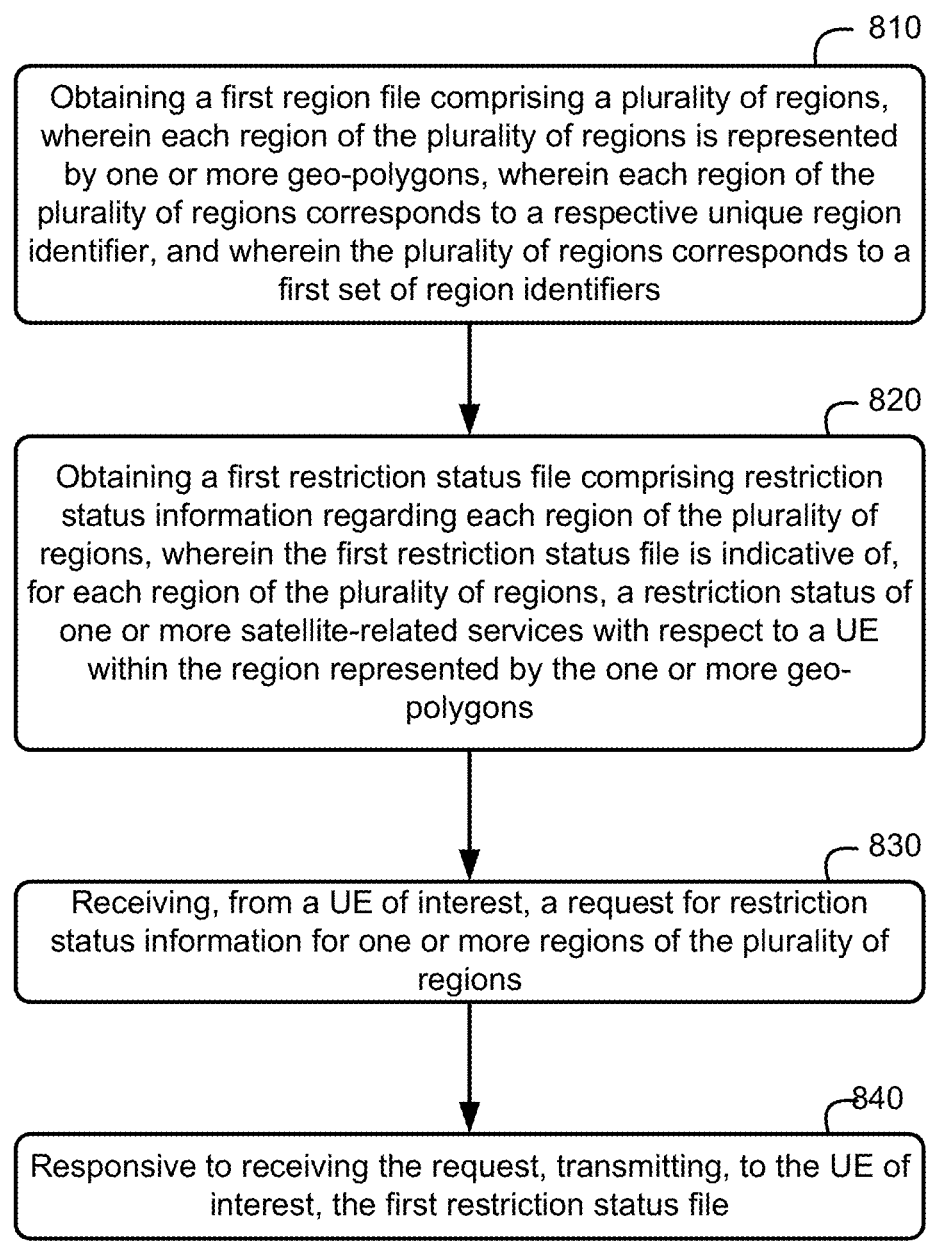
FIG. 8 is a flow diagram of a method for updating geofencing in satellite-based communications performed by a server, according to some embodiments.
Figure 11:
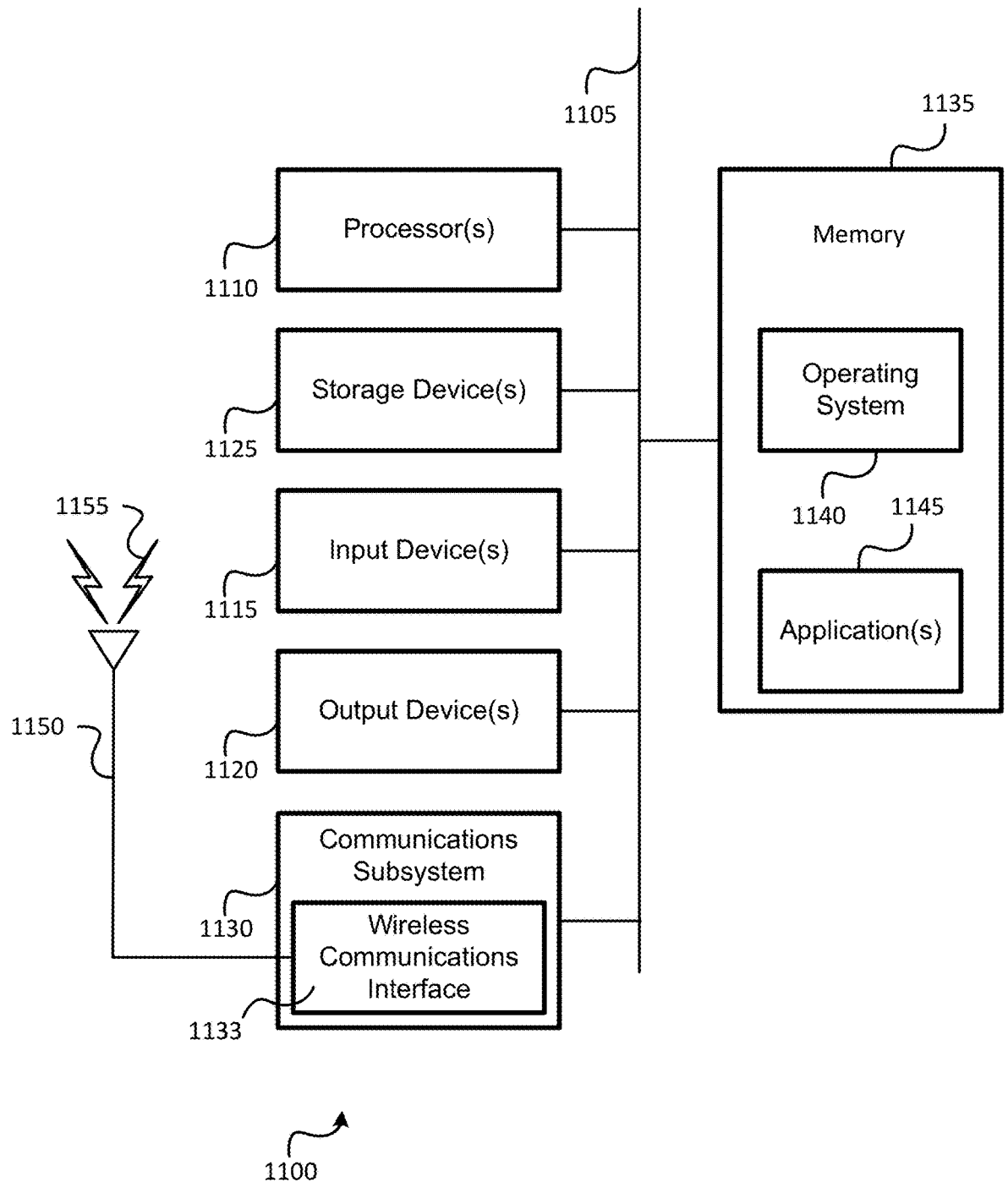
FIG. 11 is a block diagram of an embodiment of a computer system, which can be utilized in embodiments as described herein.

FIG. 8 is a flow diagram of a method for updating geofencing in satellite-based communications performed by a server, according to some embodiments. In some embodiments, the server may correspond to server 220 in FIG. 2 and/or server 410 in FIG. 4. Means/structure for performing the functionality illustrated in one or more of the blocks shown in FIG. 8 may be performed by hardware and/or software components of a computer system, as described herein. Example components of a computer system are illustrated in FIG. 11, which are described in more detail below.

At block 810, the functionality comprises obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers.

As noted above, each region identifier may comprise a hash of geo-polygon details of the corresponding region and a version indicator of the first region file. The geo-polygon details may comprise a geometry (ex. longitude and a latitude of vertices) of each geo-polygon in the region along with properties specific to the region.

In some embodiments, the plurality of geo-polygons in the first region file may correspond to different resolutions. When a higher resolution (e.g., geo-polygons having vertices spaced closer together) is used, more map detail of the region (e.g., having a more accurate representation of the shape and size of the region) may be shown. The boundary of the region the geo-polygons represent may also be defined with more precision and detail. For example, when representing small islands, or overlapping regions (e.g., region(s) within a region such as Vatican City within Rome), geo-polygons with finer resolutions may be used.

In some embodiments, the geo-polygons of the first region file may be represented using various standardized formats (e.g., GeoJSON, shapefile, KML, WKT). In some embodiments, the first region file may include a header that includes a version number of the first region file, a timestamp of the last update, a file signature, a summary of the contents, high-level properties applicable for all geo-polygons included, or any combination thereof.

In some embodiments, when being transmitted (e.g., for obtaining and/or updating the first region file), the first region file may be converted to an extensible binary format using e.g., binary encoding for geographic data.

Means for performing functionality at block 810 may comprise a bus 1105, processor(s) 1110, communications subsystem 1130, memory 1135, and/or other components of computer system 1100, as illustrated in FIG. 11.

At block 820, the functionality comprises obtaining a first restriction status file comprising restriction status information regarding each region of the plurality of regions, wherein the first restriction status file is indicative of, for each region of the plurality of regions, a restriction status of one or more satellite-related services with respect to a UE within the region represented by the one or more geo-polygons.

In some embodiments, the restriction status information may comprise information regarding different features corresponding to whether satellite-based communication or positioning is permitted, whether satellite-based communication or positioning is affected, or any combination thereof.

Means for performing functionality at block 820 may comprise a bus 1105, processor(s) 1110, communications subsystem 1130, memory 1135, and/or other components of computer system 1100, as illustrated in FIG. 11.

At block 830, the functionality comprises receiving, from a UE of interest, a request for restriction status information for one or more regions of the plurality of regions. In some embodiments, the request may include a capability report indicating satellite-related services supported by the UE of interest, and the first restriction status file may be determined based on the capability report (e.g., being customized to include restriction status information regarding satellite-related services supported by the UE of interest).

Means for performing functionality at block 830 may comprise a bus 1105, processor(s) 1110, communications subsystem 1130, memory 1135, and/or other components of computer system 1100, as illustrated in FIG. 11.

At block 840, the functionality comprises responsive to receiving the request, transmitting, to the UE of interest the first restriction status file. For example, the UE of interest may determine if the information in a second restriction file stored in the UE of interest is incomplete. In some embodiments, the UE of interest may compare the first list of unique region identifiers with a list of unique region identifiers included in the second restriction file. If one or more region identifier in the list of unique region identifiers included in the first restriction file is missing/different from the second list of unique region identifiers, information in the second first restriction file of the UE of interest may be incomplete. Responsive to a determination that at least one region identifier of the first set of region identifiers is not available in the second set of region identifiers of a second restriction status file stored in the UE of interest, transmit, to the UE of interest, restriction status information of a geo-polygon corresponding to the at least one geo-polygon identifier. For example, responsive to the determination that the information in the second restriction file is incomplete, the server may receive a request for the missing information from the UE of interest.

Means for performing functionality at block 850 may comprise a bus 1105, processor(s) 1110, communications subsystem 1030, memory 1135, and/or other components of computer system 1100, as illustrated in FIG. 11.

Figure 9:
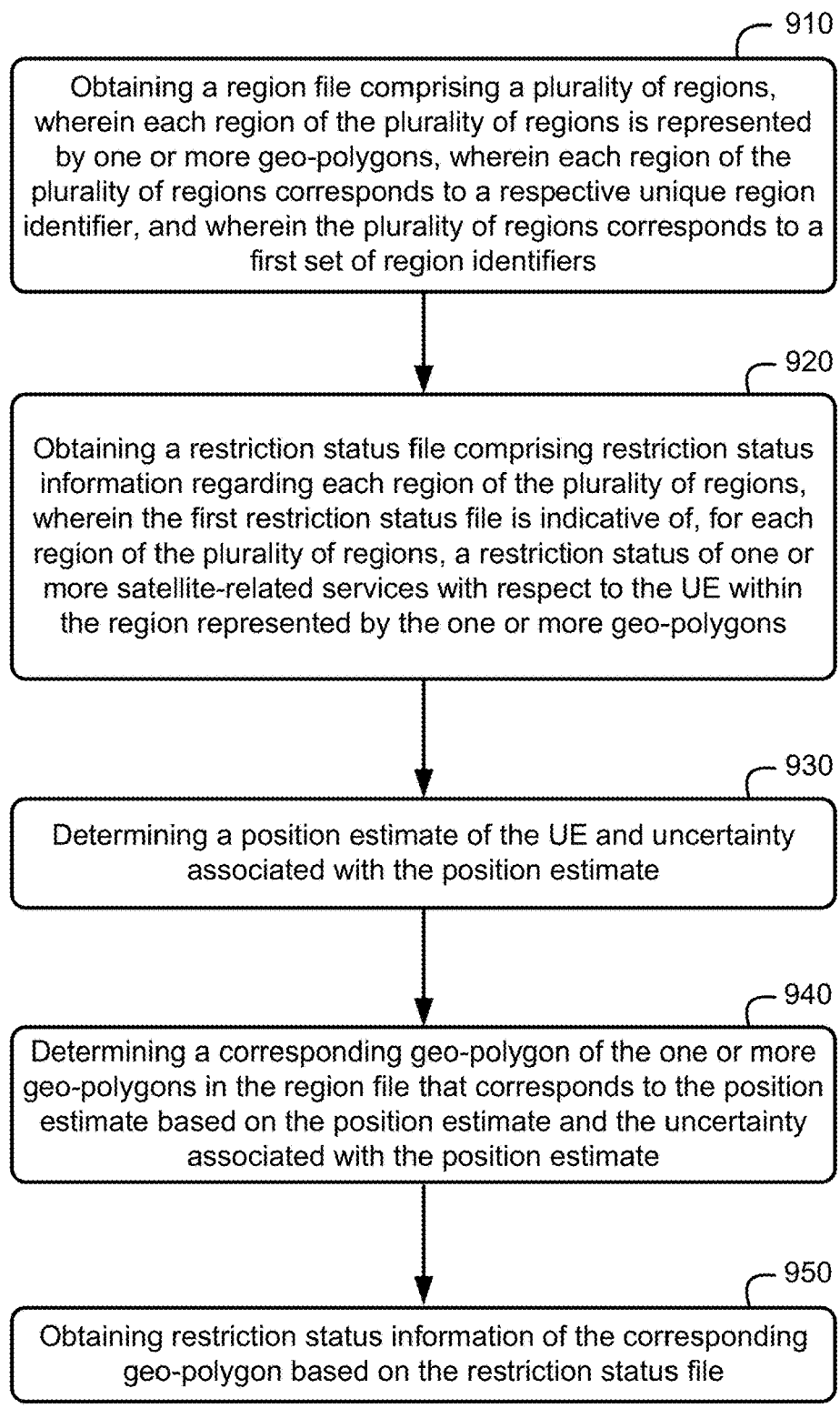
FIG. 9 is a flow diagram of a method for using geofencing in satellite-based communications performed by a UE, according to some embodiments.

FIG. 9 is a flow diagram of a method for using geofencing in satellite-based communications performed by a UE, according to some embodiments. In some embodiments, the UE may correspond to UE 205 in FIG. 2, UE 420 in FIG. 4, and/or UE 520 in FIG. 5. Means/structure for performing the functionality illustrated in one or more of the blocks shown in FIG. 9 may be performed by hardware and/or software components of a UE, as described herein. Example components of a UE are illustrated in FIG. 10, which are described in more detail below.

At block 910, the functionality comprises obtaining a region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers.

Means for performing functionality at block 910 may comprise a bus 1005, processor(s) 1010, wireless communication interface 1030, memory 1060, and/or other components of a UE 1000, as illustrated in FIG. 10.

At block 920, the functionality comprises obtaining a restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons.

Means for performing functionality at block 920 may comprise a bus 1005, processor(s) 1010, wireless communication interface 1030, memory 1060, and/or other components of a UE 1000, as illustrated in FIG. 10.

At block 930, the functionality comprises determining a position estimate of the UE and uncertainty associated with the position estimate. In some embodiments, in absence of a terrestrial network (e.g., hiking or traveling in remote places, or traveling in airplane mode), the UE may determine the position estimate using GNSS signals.

Means for performing functionality at block 930 may comprise a bus 1005, processor(s) 1010, wireless communication interface 1030, memory 1060, and/or other components of a UE 1000, as illustrated in FIG. 10.

At block 940, the functionality comprises determining a corresponding geo-polygon of the plurality of geo-polygons in the region file that corresponds to the position estimate based on the position estimate and the uncertainty associated with the position estimate.

In some embodiments, a list of candidate geo-polygons related to the position estimate may be determined (e.g., a subset geo-polygon of the plurality of geo-polygons near the position estimate considering the uncertainty associated with the position estimate) based on applying a supervised learning algorithm on the plurality of geo-polygons (e.g., using a decision tree on the plurality of geo-polygons). The UE may then check locations/points in each geo-polygons of the subset of geo-polygons (e.g., run points in each geo-polygon of the subset of geo-polygons).

Means for performing functionality at block 940 may comprise a bus 1005, processor(s) 1010, wireless communication interface 1030, memory 1060, and/or other components of a UE 1000, as illustrated in FIG. 10.

At block 950, the functionality comprises obtaining restriction status information of the corresponding geo-polygon based on the restriction status file. For example, the restriction status information regarding the activity of interest may be obtained based on the associated restriction status file.

Means for performing functionality at block 950 may comprise a bus 1005, processor(s) 1010, wireless communication interface 1030, memory 1060, and/or other components of a UE 1000, as illustrated in FIG. 10.

In some embodiments, method 900 may also include taking appropriate action(s) based on the restriction status information. In some embodiments, the appropriate action(s) may include notifying the user of satellite messaging restriction, removing GNSS bands affected by jamming or spoofing, etc.

FIG. 10 is a block diagram of an embodiment of a UE 1000, which can be utilized as described herein (e.g., in association with the previously described figures). In some embodiments, for example, the UE 1000 may comprise, for example, a mobile (e.g., movable/portable) device (e.g., tablet, laptop, vehicle, etc.). It should be noted that FIG. 10 is meant only to provide a generalized illustration of various components, any or all of which may be utilized as appropriate.

The UE 1000 is shown to comprise hardware elements that can be electrically coupled via a bus 1005 (or may otherwise be in communication, as appropriate). The hardware elements may include a processor(s) 1010 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1010 may comprise one or more processing units, which may be housed in a single integrated circuit (IC) or multiple Ics.

As shown in FIG. 10, some embodiments may have a separate DSP 1020, depending on desired functionality. Location determination and/or other determinations based on wireless communication may be provided in the processor(s) 1010 and/or wireless communication interface 1030 (discussed below). The UE 1000 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 1000 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 1000 to communicate with other devices as described in the embodiments above. The wireless communication interface 1030 may permit data and signaling to be communicated (e.g., transmitted and received) with base stations of a network, for example, via eNBs, gNBs, ng-eNBs, access points, various base stations and/or other access node types, and/or other network components, computer systems, and/or any other electronic devices communicatively coupled with base stations, as described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof. The antenna(s) 1032 may be capable of transmitting and receiving wireless signals using beams (e.g., Tx beams and Rx beams). Beam formation may be performed using digital and/or analog beam formation techniques, with respective digital and/or analog circuitry. The wireless communication interface 1030 may include such circuitry.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 1000 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from $3^{rd}$ Generation Partnership Project (3GPP). CDMA2000® is described in documents from a consortium named "$3^{rd}$ Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 1000 can further include sensor(s) 1040. Sensor(s) 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 1000 may further comprise a sensing unit 1050. The sensing unit 1050 may comprise hardware and/or software components capable of transmitting and/or receiving RF signals (e.g., RS) to detect one or more targets in the manner described herein. The sensing unit 1050 may comprise a standalone component connected with a bus 1005, as illustrated, or may be incorporated into another component (e.g., the wireless indication interface 1030). Further, the sensing unit 1050 may be communicatively coupled with an antenna 1032, which it may share with the wireless communication interface 1030. Additionally or alternatively, the sensing unit 1050 may have its own antenna (not shown). In some embodiments, the sensing unit 1050 may be communicatively coupled with multiple antennas or an antenna array capable of sending and/or receiving RF signals via directional beams.

Embodiments of the UE 1000 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 1000, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1080 is illustrated in FIG. 10 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1010, DSP 1020, and/or a processor within the wireless communication interface 1030 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 1010 or DSP 1020.

The UE 1000 may further include and/or be in communication with a memory 1060. The memory 1060 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 1000 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 1000 (and/or processor(s) 1010 or DSP 1020 within UE 1000). In some embodiments, then, such code and/or instructions can be used to configure and/or adapt a general-purpose computer (or other devices) to perform one or more operations in accordance with the described methods.

FIG. 11 is a block diagram of an embodiment of a computer system 1100, which may be used, in whole or in part, to provide the functions of one or more components and/or devices as described in the embodiments herein, including a server (e.g., sensing server/SMF, location server/LMF, etc.) in communication with one or more base stations and/or one or more sensing nodes to coordinate RF sensing as described in embodiments herein. This may include, for example, a computer server, personal computer, personal electronic device, or the like. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner. In addition, it can be noted that components illustrated by FIG. 11 can be localized to a single device and/or distributed among various networked devices, which may be disposed at different geographical locations.

The computer system 1100 is shown comprising hardware elements that can be electrically coupled via a bus 1105 (or may otherwise be in communication, as appropriate). The hardware elements may include processor(s) 1110, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1100 also may comprise one or more input devices 1115, which may comprise without limitation a mouse, a keyboard, a camera, a microphone, and/or the like; and one or more output devices 1120, which may comprise without limitation a display device, a printer, and/or the like.

The computer system 1100 may further include (and/or be in communication with) one or more non-transitory storage devices 1125, which can comprise, without limitation, local and/or network accessible storage, and/or may comprise, without limitation, a disk drive, a drive array, an optical storage device, a solid-state storage device, such as a random-access memory (RAM) and/or read-only memory (ROM), which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1100 may also include a communications subsystem 1130, which may comprise wireless communication technologies managed and controlled by a wireless communication interface 1133, as well as wired technologies (such as Ethernet, coaxial communications, universal serial bus (USB), and the like). The wireless communication interface 1133 may comprise one or more wireless transceivers that may send and receive wireless signals 1155 (e.g., signals according to 5G NR or LTE) via wireless antenna(s) 1150. Thus the communications subsystem 1130 may comprise a modem, a network card (wireless or wired), an infrared communication device, a wireless communication device, and/or a chipset, and/or the like, which may enable the computer system 1100 to communicate on any or all of the communication networks described herein to any device on the respective network, including a User Equipment (UE), base stations and/or other transmission reception points (TRPs), and/or any other electronic devices described herein. Hence, the communications subsystem 1130 may be used to receive and send data as described in the embodiments herein.

In many embodiments, the computer system 1100 will further comprise a working memory 1135, which may comprise a RAM or ROM device, as described above. Software elements, shown as being located within the working memory 1135, may comprise an operating system 1140, device drivers, executable libraries, and/or other code, such as one or more applications 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1125 described above. In some cases, the storage medium might be incorporated within a computer system, such as computer system 1100. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

In some embodiments, the geo-fencing may also be performed in a cloud-base manner. For example, when a UE attempts an activity of interest (e.g., satellite messaging), restriction status applicable to the UE may be determined by a server based on the location of the UE (e.g., the position estimate determined by the UE along with the associated uncertainty) and satellite-related service parameters determined based on the unique identifier of the UE (e.g., International Mobile Equipment Identity (IMEI)). In some embodiments, the satellite-related service parameters may include a restriction applicability time window (e.g., during what time the restriction should be enforced), unique-identifier for devices to which the restrictions apply, applicable restrictions, or any combination thereof. As noted above, in some embodiments, the applicable restrictions may include whether satellite communication is allowed, transmit power level restrictions, whether satellite-based positioning is allowed or affected by intentional or unintentional interference, level of service allowed (e.g., whether only emergency calls are allowed or person-to-person messaging is also allowed), or any combination thereof.

Figure 12:
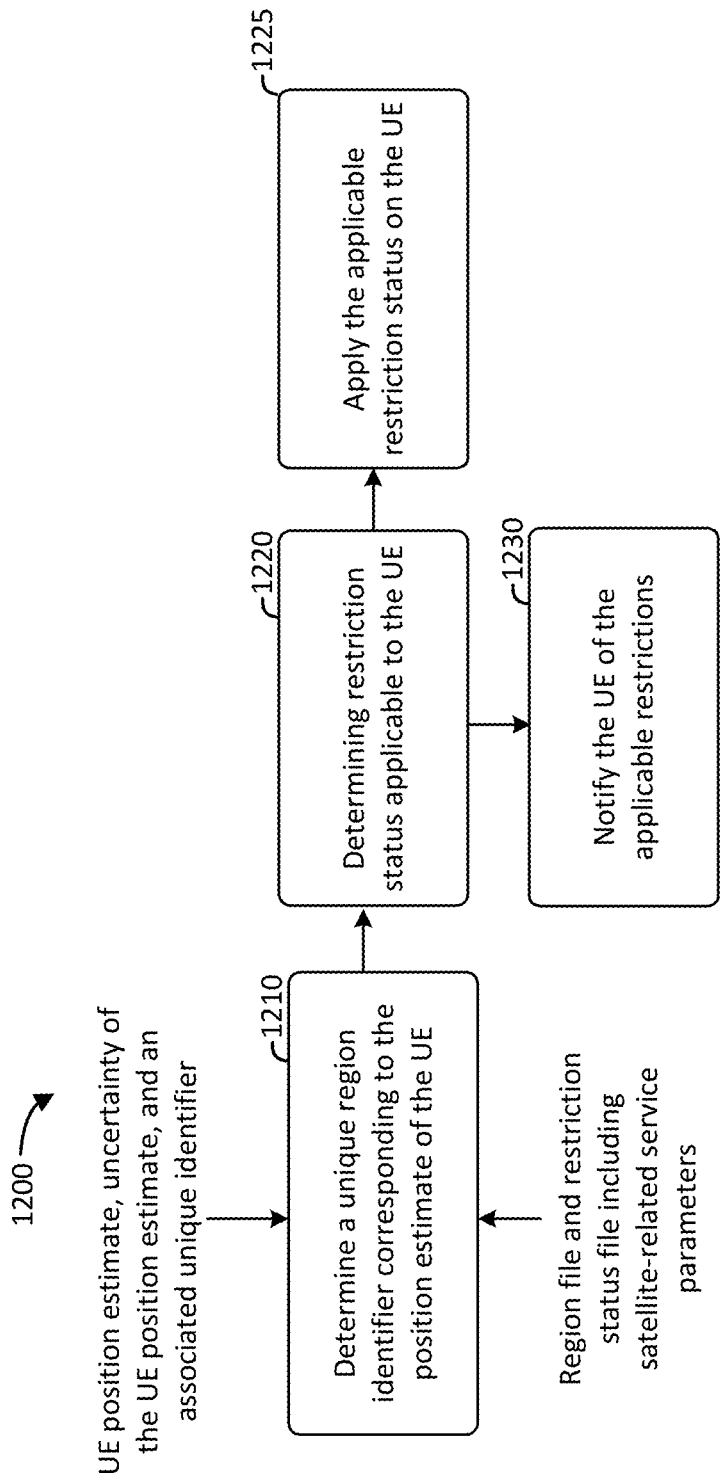
FIG. 12 is a flow diagram illustrating how cloud-based geofencing may be performed by a server for satellite-based communications, according to some embodiments.

For example, FIG. 12 is a flow diagram illustrating how cloud-based geofencing may be performed by a server for satellite-based communications, according to some embodiments. In some embodiments, cloud-based geofencing 1200 may be performed by a server (e.g., server 220 in FIG. 2, server 410 in FIG. 4, and/or server 510 in FIG. 5).

In some embodiments, before starting cloud-based geofencing 1200, the server may obtain the up-to-date version of the region file and/or the restriction status file including the satellite-related service parameters through e.g., application programming interface (API) exposed to trusted entities (e.g., government agencies). The server may also obtain a position estimate and the uncertainty of position estimate of a UE of interest, and an unique identifier of the UE, from the UE. In some embodiments, the position estimate, the uncertainty of position estimate, and the unique identifier of the UE may be received along with the data to be transmitted by the UE through the satellite associated with the UE (e.g., the satellite that receives the packet from the UE).

In some embodiments, cloud-based geofencing 1200 may start at block 1210 where a unique region identifier corresponding to the position estimate of the UE may be determined according to the region file. For example, a list of candidate geo-polygons related to the position estimate may be determined (e.g., a subset geo-polygon of the plurality of geo-polygons near the position estimate considering the uncertainty associated with the position estimate) based on applying a supervised learning algorithm on the plurality of geo-polygons (e.g., applying a decision tree on the plurality of geo-polygons). The server may then check locations/points in each geo-polygons of the subset of geo-polygons (e.g., run point in each geo-polygon of the subset of geo-polygons) and determine which region encompasses the position estimate of the UE. The unique identifier of that determined region may be used for determining the restriction status applicable to the UE.

At block 1220, restriction status including the satellite-related service parameters applicable to the UE may be determined based on the unique region identifier and the unique identifier of the UE. For example, the applicable restriction status including the satellite-related service parameters may be determined based on the restriction status information corresponding to the unique region identifier in the restriction status file and satellite-related service parameters applicable to the UE may be determined according to the unique identifier of the UE.

In some embodiments, at block 1225, restriction status applicable to the UE may be applied to the UE by the server directly. For example, the data transmitted by the UE may be routed according to the applicable restriction status.

Additionally or alternatively, at block 1230, the server may notify the applicable restriction status to the UE where the UE may enforce the applicable restriction status. For example, the server may notify the UE applicable restriction status such as transmit power level restrictions (e.g., the maxim power level allowed for transmission), satellites available to the UE, etc., and the UE may enforce those restrictions when the UE attempts to reconnect.

Figure 13:
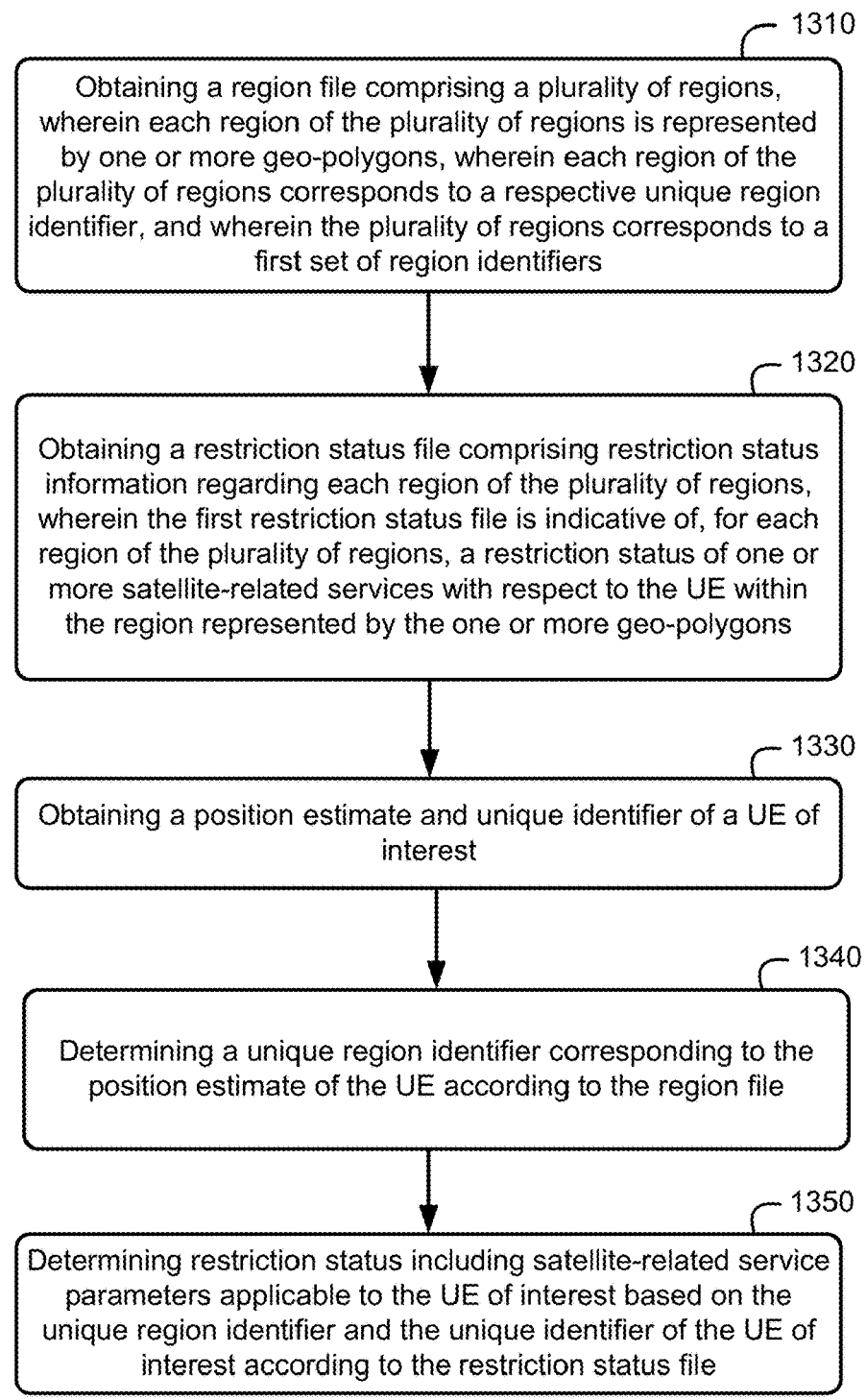
FIG. 13 is a flow diagram of a method for using cloud-based geofencing in satellite-based communications performed by a server, according to some embodiments.

FIG. 13 is a flow diagram of a method for using cloud-based geofencing in satellite-based communications performed by a server, according to some embodiments. In some embodiments, the server may correspond to server 220 in FIG. 2, server 410 in FIG. 4, and/or the server discussed with respect to FIG. 12. Means/structure for performing the functionality illustrated in one or more of the blocks shown in FIG. 13 may be performed by hardware and/or software components of a computer system, as described herein. Example components of a computer system are illustrated in FIG. 11, which are described above.

At block 1310, the functionality comprises obtaining a region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers.

Means for performing functionality at block 1310 may comprise a bus 1105, processor(s) 1110, communications subsystem 1030, memory 1135, and/or other components of computer system 1100, as illustrated in FIG. 11.

At block 1320, the functionality comprises obtaining a restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons.

Means for performing functionality at block 1320 may comprise a bus 1105, processor(s) 1110, communications subsystem 1030, memory 1135, and/or other components of computer system 1100, as illustrated in FIG. 11.

At block 1330, the functionality comprises obtaining a position estimate of a UE of interest and an unique identifier of the UE of interest. As noted above, the server may also obtain the position estimate and the uncertainty of position estimate and the unique identifier of the UE of interest, from the UE of interest. In some embodiments, the position estimate, the uncertainty of position estimate, and the unique identifier may be received along with the data to be transmitted by the UE of interest through the satellite associated with the UE of interest.

Means for performing functionality at block 1330 may comprise a bus 1105, processor(s) 1110, communications subsystem 1030, memory 1135, and/or other components of computer system 1100, as illustrated in FIG. 11.

At block 1340, the functionality comprises determining a unique region identifier corresponding to the position estimate of the UE. For example, a list of candidate geo-polygons related to the position estimate may be determined (e.g., a subset geo-polygon of the plurality of geo-polygons near the position estimate considering the uncertainty associated with the position estimate) based on applying a supervised learning algorithm on the plurality of geo-polygons (e.g., applying a decision tree on the plurality of geo-polygons). The server may then check locations/points in each geo-polygons of the subset of geo-polygons (e.g., run point in each geo-polygon of the subset of geo-polygons) and determine which region encompasses the position estimate of the UE. The unique identifier of that determined region may be used for determining the restriction status applicable to the UE.

Means for performing functionality at block 1330 may comprise a bus 1105, processor(s) 1110, communications subsystem 1030, memory 1135, and/or other components of computer system 1100, as illustrated in FIG. 11.

At block 1350, the functionality comprises determining restriction status including satellite-related service parameters applicable to the UE of interest based on the unique region identifier and the unique identifier of the UE of interest according to the restriction status file. In some embodiments, the satellite-related service parameters may include a restriction applicability time window (e.g., during what time the restriction should be enforced), unique-identifier (e.g., IMEI) for devices to which the restrictions apply, applicable restrictions, or any combination thereof. As noted above, in some embodiments, the applicable restrictions may include whether satellite communication is allowed, transmit power level restrictions, whether satellite-based positioning is allowed, level of service allowed (e.g., whether only emergency calls are allowed or person-to-person messaging is also allowed), or any combination thereof.

Means for performing functionality at block 1340 may comprise a bus 1105, processor(s) 1110, communications subsystem 1030, memory 1135, and/or other components of computer system 1100, as illustrated in FIG. 11.

As noted above, in some embodiments, after determining the restriction status applicable to the UE of interest, the applicable restriction status may be applied to the UE of interest by the server directly. For example, the data transmitted by the UE of interest may be routed according to the applicable restriction status.

Additionally or alternatively, the server may notify the applicable restriction status to the UE of interest where the UE of interest may enforce the applicable restriction status. For example, the server may notify the UE of interest applicable restriction status such as transmit power level restrictions (e.g., the maxim power level allowed for transmission), satellites available to the UE of interest, etc., and the UE of interest may enforce those restrictions when the UE of interest attempts to reconnect.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. An example method of geofencing for satellite communication performed by a UE, the method comprising obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The method also comprises obtaining a first restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons. The method further comprises receiving, from a server, a second restriction status file comprising a second set of region identifiers and corresponding restriction status information, determining a difference between the first set of region identifiers and the second set of region identifiers, and updating the first region file, the first restriction status file, or both based on the difference.

Clause 2. The method of the clause 1, further comprising: prior to receiving the second restriction status file, transmitting, to the server, a request for the second restriction status file, wherein the request indicates a version indicator of the first region file.

Clause 3. The method of any of clause 1 or 2, further comprising: transmitting, to the server, a version indicator of the first region file; responsive to a determination that the first region file is different from a second region file, determined based on the version indicator of the first region file, receiving, from the server, the second region file; and authenticating the second region file received from the server.

Clause 4. The method of any of clauses 1-3, wherein each region identifier of the second set of region identifiers comprises a hash of region details of corresponding one or more geo-polygons and a version indicator of the second region file.

Clause 5. The method of any of clauses 1-4 wherein the region details of the corresponding one or more geo-polygons comprise geometry and properties of the corresponding one or more geo-polygons representing the region.

Clause 6. The method of any of clauses 1-5, wherein obtaining the first region file further comprises: receiving, from the server, the first region file; or retrieving the first region file from local memory.

Clause 7. The method of any of clauses 1-6, wherein the one or more geo-polygons correspond to different resolutions.

Clause 8. The method of any of clauses 1-7, wherein the restriction status information comprises information regarding different features, wherein the different features correspond to: whether satellite-based communication is permitted or affected by a provider; whether satellite-based positioning is affected; or any combination thereof.

Clause 9. The method of any of clauses 1-8, further comprising: transmitting, to the server, a capability report indicating satellite-related services supported by the UE, wherein the second restriction status file is determined based on the capability report.

Clause 10. The method of any of clauses 1-9, wherein a header of the first region file comprises data indicating: a version indicator of the first region file; a time-stamp of a latest update of the first region file; a file signature of the first region file; a summary of contents provided in the first region file; properties applicable for the one or more geo-polygons; or any combination thereof.

Clause 11. The method of any of clauses 1-10, wherein the second region file is transmitted in an extensible binary format.

Clause 12. An example method of geofencing for satellite communication performed by a server, the method comprising obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The method also comprises obtaining a first restriction status file comprising restriction status information regarding each region of the plurality of regions, wherein the first restriction status file is indicative of, for each region of the plurality of regions, a restriction status of one or more satellite-related services with respect to a UE within the region represented by the one or more geo-polygons. The method further comprises receiving, from a UE of interest, a request for restriction status information for one or more regions of the plurality of regions, and responsive to receiving the request, transmitting, to the UE of interest, the first restriction status file.

Clause 13. The method of the clause 12, further comprising: receiving, from the UE, a version indicator of a second region file stored in the UE; and responsive to a determination that the first region file is different from a second region file, determined based on the version indicator of the second region file, transmitting, to the UE, the first region file.

Clause 14. The method of any of clause 12 or 13, wherein each region identifier of the first set of region identifiers comprises a hash of region details of the corresponding one or more geo-polygons and a version indicator of the first region file.

Clause 15. The method of any of clauses 12-14, wherein the region details of the corresponding one or more geo-polygons comprise geometry and properties of the corresponding one or more geo-polygons representing the region.

Clause 16. The method of any of clauses 12-15 wherein the one or more geo-polygons correspond to different resolutions.

Clause 17. The method of any of clauses 12-16, wherein the restriction status information comprises information regarding different features, wherein the different features correspond to: whether satellite-based communication is permitted or affected by a provider; whether satellite-based positioning is affected; or any combination thereof.

Clause 18. The method of any of clauses 12-17, further comprising: receiving, from the UE, a capability report indicating satellite-related services supported by the UE, wherein the first restriction status file is determined based on the capability report.

Clause 19. The method of any of clauses 12-18, wherein a header of the first region file comprises data indicating: a version indicator of the first region file; a time-stamp of a latest update of the first region file; a file signature of the first region file; a summary of contents provided in the first region file; properties applicable for the one or more geo-polygons; or any combination thereof.

Clause 20. The method of any of clauses 12-19, wherein the first region file is transmitted in an extensible binary format.

Clause 21. An example method of geofencing for satellite communication performed by a UE, the method comprising obtaining a region file comprising a plurality of regions, wherein each region of the plurality of regions is represented by one or more geo-polygons, wherein each region of the plurality of regions corresponds to a respective unique region identifier. The method also comprises obtaining a restriction status file comprising restriction status information regarding each region of the plurality of regions, wherein the restriction status file is indicative of, for each region of the plurality of regions, a restriction status of one or more satellite-related services with respect to the UE within the region represented by the one or more geo-polygons. The method further comprises determining a position estimate of the UE and uncertainty associated with the position estimate, determining a corresponding geo-polygon of the one or more geo-polygons in the region file that corresponds to the position estimate based on the position estimate and the uncertainty associated with the position estimate, and obtaining restriction status information of the corresponding geo-polygon based on the restriction status file.

Clause 22. The method of the clause 21, wherein determining a corresponding geo-polygon further comprises: identifying a subset geo-polygon of the one or more geo-polygons corresponding to the position estimate based on applying a supervised learning algorithm on the one or more geo-polygons; and determining the corresponding geo-polygon based on checking locations in each geo-polygons of the subset geo-polygons.

Clause 23. An example method of cloud-based geofencing for satellite communication performed by a server, the method comprising obtaining a region file comprising a plurality of regions, wherein each region of the plurality of regions is represented by one or more geo-polygons, wherein each region of the plurality of regions corresponds to a respective unique region identifier. The method also comprises obtaining a restriction status file comprising restriction status information regarding each region of the plurality of regions, wherein the restriction status file is indicative of, for each region of the plurality of regions, a restriction status of one or more satellite-related services with respect to a UE within the region represented by the one or more geo-polygons. The method further comprises obtaining a position estimate of a UE of interest and a unique identifier of the UE interest, determining a unique region identifier corresponding to the position estimate of the UE according to the region file, and determining restriction status including satellite-related service parameters applicable to the UE of interest based on the unique region identifier and the unique identifier of the UE of interest according to the restriction status file.

Clause 24. The method of the clause 23, wherein the satellite-related service parameters comprises: a restriction applicability time window; unique-identifier, for devices to which the restrictions applies; applicable restrictions; or any combination thereof.

Clause 25. The method of any of clause 23 or 24 wherein applicable restrictions comprises: whether satellite communication is allowed by a provider; transmit power level restrictions; whether satellite-based positioning is allowed or affected; level of service allowed; or any combination thereof.

Clause 26. The method of any of clauses 23-25 further comprising: applying the applicable restriction status to the UE of interest.

Clause 27. The method of any of clauses 23-26 further comprising: notifying the UE of interest, the applicable restriction status.

Clause 28. An example UE for geofencing for satellite communication comprising a transceiver, a memory, and one or more processors communicatively coupled with the transceiver and the memory. The one or more processors are configured to obtain a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The one or more processors are also configured to obtain a first restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons. The one or more processors are further configured to receive, from a server, a second restriction status file comprising a second set of region identifiers and corresponding restriction status information, determine a difference between the first set of region identifiers and the second set of region identifiers, and update the first region file, the first restriction status file, or both based on the difference.

Clause 29. The UE of the clause 28, wherein the one or more processors are further configured to: prior to receive the second restriction status file, transmit, to the server, a request for the second restriction status file, wherein the request indicates a version indicator of the first region file.

Clause 30. The UE of any of clause 28 or 29, wherein the one or more processors are further configured to: transmit, to the server, a version indicator of the first region file; responsive to a determination that the first region file is different from a second region file, determined based on the version indicator of the first region file, receive, from the server, the second region file; and authenticate the second region file received from the server.

Clause 31. The UE of any of clauses 28-30, wherein each region identifier of the second set of region identifiers comprises a hash of region details of corresponding one or more geo-polygons and a version indicator of the second region file.

Clause 32. The UE of any of clauses 28-31 wherein the region details of the corresponding one or more geo-polygons comprise geometry and properties of the corresponding one or more geo-polygons representing the region.

Clause 33. The UE of any of clauses 28-32, wherein obtaining the first region file further comprises: receiving, from the server, the first region file; or retrieving the first region file from local memory.

Clause 34. The UE of any of clauses 28-33, wherein to obtain the first region file the one or more processors are further configured to: receive, from the server, the first region file; or retrieve the first region file from local memory.

Clause 35. The UE of any of clauses 28-34, wherein the restriction status information comprises information regarding different features, wherein the different features correspond to: whether satellite-based communication is permitted or affected by a provider; whether satellite-based positioning is affected; or any combination thereof.

Clause 36. The UE of any of clauses 28-35, wherein the one or more processors are further configured to: transmit, to the server, a capability report indicating satellite-related services supported by the UE, wherein the second restriction status file is determined based on the capability report.

Clause 37. The UE of any of clauses 28-36, wherein a header of the first region file comprises data indicating: a version indicator of the first region file; a time-stamp of a latest update of the first region file; a file signature of the first region file; a summary of contents provided in the first region file; properties applicable for the one or more geo-polygons; or any combination thereof.

Clause 38. The UE of any of clauses 28-37, wherein the second region file is transmitted in an extensible binary format.

Clause 39. An example server for geofencing for satellite communication comprising a transceiver, a memory, and one or more processors communicatively coupled with the transceiver and the memory. The one or more processors are configured to obtain a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers. The one or more processors are also configured to obtain a first restriction status file comprising restriction status information regarding each region of the plurality of regions, wherein the first restriction status file is indicative of, for each region of the plurality of regions, a restriction status of one or more satellite-related services with respect to a UE within the region represented by the one or more geo-polygons. The one or more processors are further configured to receive, from a UE of interest, a request for restriction status information for one or more regions of the plurality of regions, and responsive to receiving the request, transmit, to the UE of interest, the first restriction status file.

Clause 40. The server of the clause 39, wherein the one or more processors are further configured to: receive, from the UE, a version indicator of a second region file stored in the UE; and responsive to a determination that the first region file is different from a second region file, determined based on the version indicator of the second region file, transmit, to the UE, the first region file.

Clause 41. The server of any of clause 39 or 40, wherein each region identifier of the first set of region identifiers comprises a hash of region details of the corresponding one or more geo-polygons and a version indicator of the first region file.

Clause 42. The server of any of clauses 39-41, wherein the region details of the corresponding one or more geo-polygons comprise geometry and properties of the corresponding one or more geo-polygons representing the region.

Clause 43. The server of any of clauses 39-42 wherein the one or more geo-polygons correspond to different resolutions.

Clause 44. The server of any of clauses 39-43, wherein the restriction status information comprises information regarding different features, wherein the different features correspond to: whether satellite-based communication is permitted or affected by a provider; whether satellite-based positioning is affected; or any combination thereof.

Clause 45. The server of any of clauses 39-44, the one or more processors are further configured to: receive, from the UE, a capability report indicating satellite-related services supported by the UE, wherein the first restriction status file is determined based on the capability report.

Clause 46. The server of any of clauses 39-45, wherein a header of the first region file comprises data indicating: a version indicator of the first region file; a time-stamp of a latest update of the first region file; a file signature of the first region file; a summary of contents provided in the first region file; properties applicable for the one or more geo-polygons; or any combination thereof.

Clause 47. The server of any of clauses 39-46, wherein the first region file is transmitted in an extensible binary format.

Clause 48. An example UE for geofencing for satellite communication comprising a transceiver, a memory, and one or more processors communicatively coupled with the transceiver and the memory. The one or more processors are configured to obtain a region file comprising a plurality of regions, wherein each region of the plurality of regions is represented by one or more geo-polygons, wherein each region of the plurality of regions corresponds to a respective unique region identifier. The one or more processors are also configured to obtain a restriction status file comprising restriction status information regarding each region of the plurality of regions, wherein the restriction status file is indicative of, for each region of the plurality of regions, a restriction status of one or more satellite-related services with respect to the UE within the region represented by the one or more geo-polygons. The one or more processors are further configured to determine a position estimate of the UE and uncertainty associated with the position estimate, determine a corresponding geo-polygon of the one or more geo-polygons in the region file that corresponds to the position estimate based on the position estimate and the uncertainty associated with the position estimate, and obtain restriction status information of the corresponding geo-polygon based on the restriction status file.

Clause 49. The UE of the clause 48, to determine a corresponding geo-polygon, the one or more processors are further configured to: identify a subset geo-polygon of the one or more geo-polygons corresponding to the position estimate based on applying a supervised learning algorithm on the one or more geo-polygons; and determine the corresponding geo-polygon based on checking locations in each geo-polygons of the subset geo-polygons.

Clause 50. An example server for cloud-based geofencing for satellite communication comprising a transceiver, a memory, and one or more processors communicatively coupled with the transceiver and the memory The one or more processors are configured to obtain a region file comprising a plurality of regions, wherein each region of the plurality of regions is represented by one or more geo-polygons, wherein each region of the plurality of regions corresponds to a respective unique region identifier. The one or more processors are also configured to obtain a restriction status file comprising restriction status information regarding each region of the plurality of regions, wherein the restriction status file is indicative of, for each region of the plurality of regions, a restriction status of one or more satellite-related services with respect to a UE within the region represented by the one or more geo-polygons. The one or more processors are further configured to obtain a position estimate of a UE of interest and a unique identifier of the UE interest, determine a unique region identifier corresponding to the position estimate of the UE according to the region file, and determine restriction status including satellite-related service parameters applicable to the UE of interest based on the unique region identifier and the unique identifier of the UE of interest according to the restriction status file.

Clause 51. The server of the clause 50, wherein the satellite-related service parameters comprise: a restriction applicability time window; unique-identifier, for devices to which the restrictions apply; applicable restrictions; or any combination thereof.

Clause 52. The server of any of clause 50 or 51 wherein the applicable restrictions comprise: whether satellite communication is allowed by a provider; transmit power level restrictions; whether satellite-based positioning is allowed or affected; level of service allowed; or any combination thereof.

Clause 53. The server of any of clauses 50-52 the one or more processors are further configured to: applying the applicable restriction status to the UE of interest.

Clause 54. The server of any of clauses 50-53 the one or more processors are further configured to: notifying the UE of interest, the applicable restriction status.

What is claimed is:

1. A method of geofencing for satellite communication performed by a user equipment (UE), the method comprising:
obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers;
obtaining a first restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons;
receiving, from a server, a second restriction status file comprising a second set of region identifiers and corresponding restriction status information;
determining a difference between the first set of region identifiers and the second set of region identifiers; and
updating the first region file, the first restriction status file, or both based on the difference.

2. The method of claim 1 further comprising:
prior to receiving the second restriction status file, transmitting, to the server, a request for the second restriction status file, wherein the request indicates a version indicator of the first region file.

3. The method of claim 1 further comprising:
transmitting, to the server, a version indicator of the first region file;
responsive to a determination that the first region file is different from a second region file, determined based on the version indicator of the first region file, receiving, from the server, the second region file; and
authenticating the second region file received from the server.

4. The method of claim 3, wherein each region identifier of the second set of region identifiers comprises a hash of region details of corresponding one or more geo-polygons and a version indicator of the second region file.

5. The method of claim 4, wherein the region details of the corresponding one or more geo-polygons comprise geometry and properties of the corresponding one or more geo-polygons representing the region.

6. The method of claim 3, wherein the second region file is transmitted in an extensible binary format.

7. The method of claim 1, wherein obtaining the first region file further comprises:
receiving, from the server, the first region file; or
retrieving the first region file from local memory.

8. The method of claim 1, wherein the one or more geo-polygons correspond to different resolutions.

9. The method of claim 1, wherein the restriction status information comprises information regarding different features, wherein the different features correspond to:
whether satellite-based communication is permitted or affected by a provider;
whether satellite-based positioning is affected; or
any combination thereof.

10. The method of claim 1 further comprising:
transmitting, to the server, a capability report indicating satellite-related services supported by the UE, wherein the second restriction status file is determined based on the capability report.

11. The method of claim 1, wherein a header of the first region file comprises data indicating:
a version indicator of the first region file;
a time-stamp of a latest update of the first region file;
a file signature of the first region file;
a summary of contents provided in the first region file;
properties applicable for the one or more geo-polygons; or
any combination thereof.

12. A method of geofencing for satellite communication performed by a server, the method comprising:
obtaining a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers;
obtaining a first restriction status file comprising restriction status information regarding each region of the plurality of regions, wherein the first restriction status file is indicative of, for each region of the plurality of regions, a restriction status of one or more satellite-related services with respect to a user equipment (UE) within the region represented by the one or more geo-polygons;
receiving, from a UE of interest, a request for restriction status information for one or more regions of the plurality of regions; and
responsive to receiving the request, transmitting, to the UE of interest, the first restriction status file.

13. The method of claim 12 further comprising:
receiving, from the UE, a version indicator of a second region file stored in the UE; and
responsive to a determination that the first region file is different from a second region file, determined based on the version indicator of the second region file, transmitting, to the UE, the first region file.

14. The method of claim 12, wherein each region identifier of the first set of region identifiers comprises a hash of region details of the corresponding one or more geo-polygons and a version indicator of the first region file.

15. The method of claim 14, wherein the region details of the corresponding one or more geo-polygons comprise geometry and properties of the corresponding one or more geo-polygons representing the region.

16. The method of claim 12, wherein the one or more geo-polygons correspond to different resolutions.

17. The method of claim 12, wherein the restriction status information comprises information regarding different features, wherein the different features correspond to:
whether satellite-based communication is permitted or affected by a provider;
whether satellite-based positioning is affected; or
any combination thereof.

18. The method of claim 12 further comprising:
receiving, from the UE, a capability report indicating satellite-related services supported by the UE, wherein the first restriction status file is determined based on the capability report.

19. The method of claim 12, wherein a header of the first region file comprises data indicating:
a version indicator of the first region file;
a time-stamp of a latest update of the first region file;
a file signature of the first region file;
a summary of contents provided in the first region file;
properties applicable for the one or more geo-polygons; or
any combination thereof.

20. The method of claim 12, wherein the first region file is transmitted in an extensible binary format.

21. A user equipment (UE) for geofencing for satellite communication comprising:
a transceiver;
a memory; and
one or more processors communicatively coupled with the transceiver and the memory, wherein the one or more processors are configured to:
obtain a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers;
obtain a first restriction status file comprising restriction status information regarding each region of the plurality of regions, wherein the first restriction status file is indicative of, for each region of the plurality of regions, a restriction status of one or more satellite-related services with respect to the UE within the region represented by the one or more geo-polygons;
receive, from a server, a second restriction status file comprising a second set of region identifiers and corresponding restriction status information;
determine a difference between the first set of region identifiers and the second set of region identifiers; and
update the first region file, the first restriction status file, or both based on the difference.

22. The UE of claim 21, wherein the one or more processors are further configured to:
prior to receive the second restriction status file, transmit, to the server, a request for the second restriction status file, wherein the request indicates a version indicator of the first region file.

23. The UE of claim 21, wherein the one or more processors are further configured to:
transmit, to the server, a version indicator of the first region file;
responsive to a determination that the first region file is different from a second region file, determined based on the version indicator of the first region file, receive, from the server, the second region file; and authenticate the second region file received from the server.

24. The UE of claim 23, wherein each region identifier of the second set of region identifiers comprises a hash of region details of corresponding one or more geo-polygons and a version indicator of the second region file.

25. The UE of claim 24, wherein the region details of the corresponding one or more geo-polygons comprise geometry and properties of the corresponding one or more geo-polygons representing the region.

26. The UE of claim 21, wherein to obtain the first region file the one or more processors are further configured to:
receive, from the server, the first region file; or
retrieve the first region file from local memory.

27. A server for geofencing for satellite communication comprising:
a transceiver;
a memory; and
one or more processors communicatively coupled with the transceiver and the memory, wherein the one or more processors are configured to:
obtain a first region file comprising a plurality of regions, wherein each region of the plurality of regions is represented by one or more geo-polygons, wherein each region of the plurality of regions corresponds to a respective unique region identifier, and wherein the plurality of regions corresponds to a first set of region identifiers;
obtain a first restriction status file comprising restriction status information regarding each region of the plurality of regions, wherein the first restriction status file is indicative of, for each region of the plurality of regions, a restriction status of one or more satellite-related services with respect to a user equipment (UE) within the region represented by the one or more geo-polygons;
receive, from a UE of interest, a request for restriction status information for one or more regions of the plurality of regions; and
responsive to receiving the request, transmit, to the UE of interest, the first restriction status file.

28. The server of claim 27, wherein the one or more processors are further configured to:
receive, from the UE, a version indicator of a second region file stored in the UE; and
responsive to a determination that the first region file is different from a second region file, determined based on the version indicator of the second region file, transmit, to the UE, the first region file.

29. The server of claim 27, wherein each region identifier of the first set of region identifiers comprises a hash of region details of the corresponding one or more geo-polygons and a version indicator of the first region file.

30. The server of claim 29, wherein the region details of the corresponding one or more geo-polygons comprise geometry and properties of the corresponding one or more geo-polygons representing the region.

* * * * *